US012524042B2

(12) United States Patent
Lee

(10) Patent No.: US 12,524,042 B2
(45) Date of Patent: Jan. 13, 2026

(54) WINDOW, ELECTRONIC DEVICE INCLUDING THE SAME, AND METHOD OF MANUFACTURING THE WINDOW

(71) Applicant: Samsung Display Co., Ltd., Yongin-si (KR)

(72) Inventor: Hoikwan Lee, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 555 days.

(21) Appl. No.: 17/661,861

(22) Filed: May 3, 2022

(65) Prior Publication Data

US 2023/0044539 A1 Feb. 9, 2023

(30) Foreign Application Priority Data

Jul. 28, 2021 (KR) .................. 10-2021-0098875

(51) Int. Cl.
*C03C 23/00* (2006.01)
*C03C 4/00* (2006.01)
*C03C 21/00* (2006.01)
*G06F 1/16* (2006.01)

(52) U.S. Cl.
CPC .............. *G06F 1/1652* (2013.01); *C03C 4/00* (2013.01); *C03C 21/008* (2013.01); *C03C 23/007* (2013.01); *C03C 2217/70* (2013.01); *Y10T 428/315* (2015.01)

(58) Field of Classification Search
CPC ................................. C03C 21/002
See application file for complete search history.

(56) References Cited

U.S. PATENT DOCUMENTS

| 2016/0194243 | A1 | 7/2016 | Lee et al. |
| 2017/0334770 | A1 | 11/2017 | Luzzato et al. |
| 2019/0002342 | A1 | 1/2019 | Nakagawa et al. |
| 2021/0107826 | A1* | 4/2021 | Hwang ................. C03C 21/002 |
| 2022/0287195 | A1* | 9/2022 | Chen ....................... B32B 17/06 |
| 2022/0291712 | A1* | 9/2022 | Baby .................... H04M 1/0214 |

FOREIGN PATENT DOCUMENTS

| KR | 10-1022591 B1 | 3/2011 |
| KR | 10-1493749 B1 | 2/2015 |
| KR | 101986370 B1 * | 6/2019 |
| KR | 10-2111138 B1 | 5/2020 |
| KR | 10-2185889 B1 | 12/2020 |
| WO | WO 2017/154654 A1 | 9/2017 |
| WO | WO-2019209012 A1 * | 10/2019 ............. C03C 17/23 |

OTHER PUBLICATIONS

WO-2019209012-A1 EPO Machine Translation Retrieved Nov. 26, 2024. (Year: 2024).*
KR-101986370-B1 EPO Machine Translation Retrieved Nov. 27, 2024. (Year: 2024).*

* cited by examiner

*Primary Examiner* — Lisa L Herring
(74) *Attorney, Agent, or Firm* — Womble Bond Dickinson (US) LLP

(57) ABSTRACT

A window for a window cover of an electronic device, includes: a glass material; a lower surface; an upper surface opposite to the lower surface; a folding portion to be folded relative to a folding axis extending in a first direction; and a non-folding portion including a first non-folding portion, and a second non-folding portion spaced from the first non-folding portion with the folding portion interposed therebetween. The non-folding portion has a surface compressive stress less than a surface compressive stress of the folding portion.

11 Claims, 18 Drawing Sheets

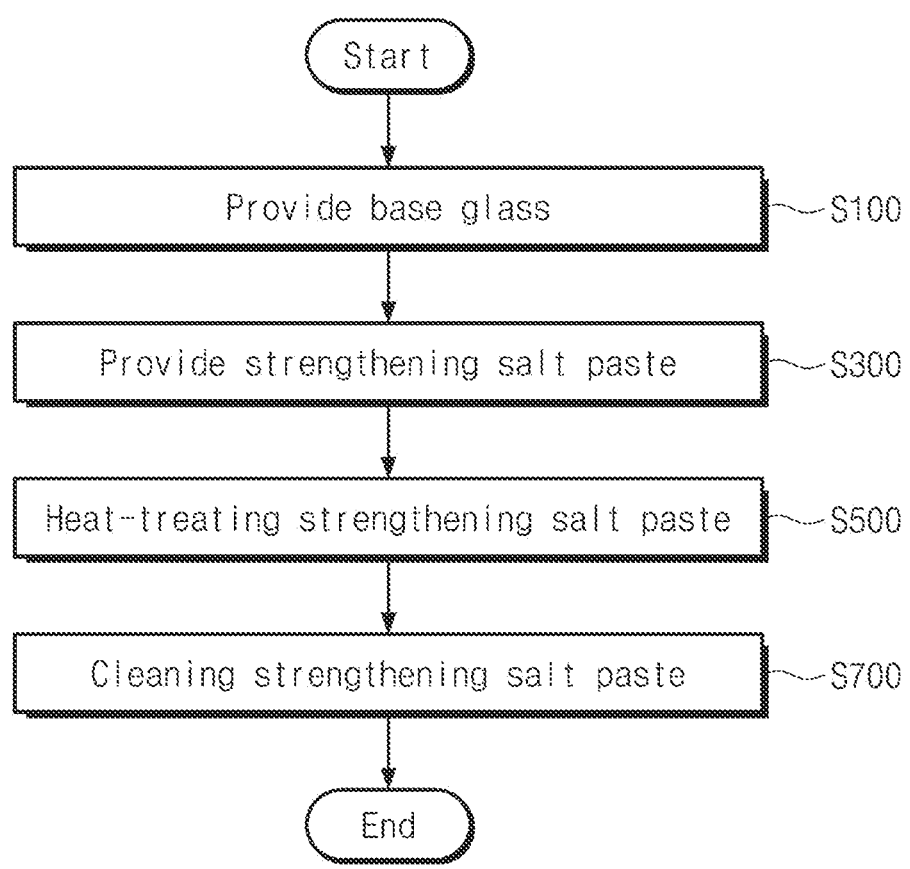

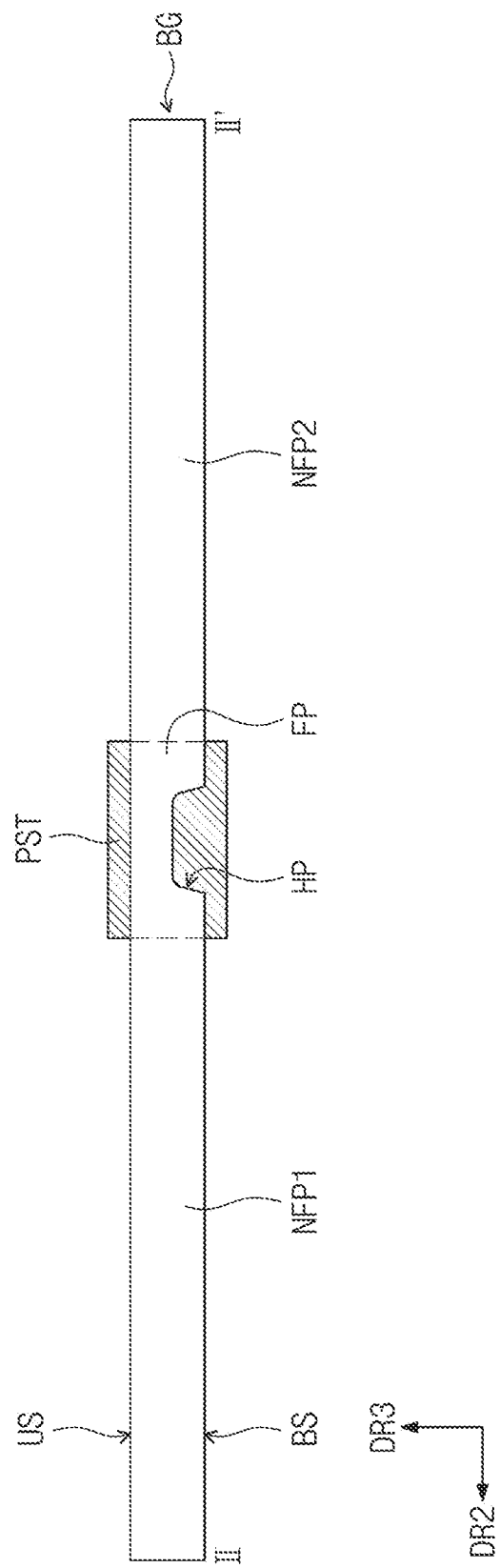

WINDOW, ELECTRONIC DEVICE INCLUDING THE SAME, AND METHOD OF MANUFACTURING THE WINDOW

CROSS-REFERENCE TO RELATED APPLICATION

This patent application claims priority to and the benefit of Korean Patent Application No. 10-2021-0098875, filed on Jul. 28, 2021, the content of which is hereby incorporated by reference in its entirety.

BACKGROUND

1. Field

Aspects of embodiments of the present disclosure relate to a window, an electronic device including the same, and a method of manufacturing the same. More particularly, aspects of embodiments of the present disclosure relate to a foldable window, an electronic device including the foldable window, and a method of manufacturing the foldable window.

2. Description of the Related Art

Various types of electronic devices are being used to provide image information. Recently, electronic devices including a flexible display panel that is foldable or bendable are being developed. Unlike a rigid electronic device, the flexible electronic device is able to be folded, rolled, or bent. Because the shape of the flexible electronic device may be changed in various ways, the flexible electronic device may be portable regardless of the size of its screen for displaying images.

The flexible electronic device may include a window that protects a display panel without causing disruption to the folding or bending operation. Accordingly, a window having excellent folding characteristics without deteriorating mechanical properties may be desired.

The above information disclosed in this Background section is for enhancement of understanding of the background of the present disclosure, and therefore, it may contain information that does not constitute prior art.

SUMMARY

One or more embodiments of the present disclosure are directed to a window having excellent folding characteristics and mechanical properties.

One or more embodiments of the present disclosure are directed to an electronic device including the window having excellent folding characteristics and improved impact resistance against external impacts.

One or more embodiments of the present disclosure are directed to a method of manufacturing the window, in which a degree of chemical strengthening of a folding portion may be different from that of a non-folding portion.

According to one or more embodiments of the present disclosure, a window for a window cover of an electronic device, includes: a glass material; a lower surface; an upper surface opposite to the lower surface; a folding portion configured to be folded relative to a folding axis extending in a first direction; and a non-folding portion including a first non-folding portion, and a second non-folding portion spaced from the first non-folding portion with the folding portion interposed therebetween. The non-folding portion has a surface compressive stress less than a surface compressive stress of the folding portion.

In an embodiment, the lower surface may have a recess portion defined at the folding portion, and the upper surface may be a flat surface at the folding portion.

In an embodiment, the folding portion may have a first surface compressive stress, and the non-folding portion may include: a first portion spaced from the folding portion, and having a second surface compressive stress less than the first surface compressive stress of the folding portion; and a second portion between the folding portion and the first portion, and having a surface compressive stress that decreases from the folding portion toward the first portion.

In an embodiment, a maximum value of the first surface compressive stress of the folding portion may be equal to or greater than about 300 MPa, and a maximum value of the second surface compressive stress of the first portion may be equal to or smaller than about 100 MPa.

In an embodiment, the second surface compressive stress of the first portion may be equal to zero (0).

In an embodiment, the surface compressive stress of the second portion may include a third surface compressive stress, a maximum value of the first surface compressive stress of the folding portion may be equal to or greater than about 500 MPa, a maximum value of the second surface compressive stress of the first portion may be equal to or smaller than about 100 MPa, and the third surface compressive stress may have a value between the maximum value of the first surface compressive stress and the maximum value of the second surface compressive stress.

In an embodiment, the folding portion may include: a first compressive stress area adjacent to the upper surface; a second compressive stress area adjacent to the lower surface; and a base area between the first compressive stress area and the second compressive stress area, and each of the first compressive stress area and the second compressive stress area may have a concentration of K+ ions that is greater than a concentration of K+ ions of the base area.

In an embodiment, the first portion of the non-folding portion may include the base area, and may exclude the first compressive stress area and the second compressive stress area; the second portion of the non-folding portion may include the base area, the first compressive stress area, and the second compressive stress area; and the base area of the second portion may have a thickness that increases from the folding portion toward the first portion.

In an embodiment, the folding portion may have a first surface compressive stress. The non-folding portion may include: a first portion spaced from the folding portion, and having a second surface compressive stress less than the first surface compressive stress of the folding portion; and a second portion between the folding portion and the first portion, and having a third surface compressive stress less than the first surface compressive stress and greater than the second surface compressive stress. The first portion may include: a first base portion; a first upper surface compressive stress portion on the first base portion; and a first lower surface compressive stress portion underneath the first base portion, and the second portion may include: a second base portion; a second upper surface compressive stress portion on the second base portion; and a second lower surface compressive stress portion underneath the second base portion. The folding portion may include: a third base portion; a third upper surface compressive stress portion on the third base portion; and a third lower surface compressive stress portion underneath the third base portion, and each of the first, second, and third upper surface compressive stress portions and each of the first, second, and third lower surface compressive stress portions may have a concentration of K+ ions that are greater than a concentration of K+ ions of the first, second, and third base portions.

In an embodiment, concentrations of K+ ions of the first portion, the second portion, and upper and lower surfaces of the folding portion may satisfy $C_{NP-S1}(K+)<C_{NP-S2}(K+)<C_{FP}(K+)$, where $C_{NP-S1}(K+)$, $C_{NP-S2}(K+)$, and $C_{FP}(K+)$ may denote the concentrations of the K+ ions of the first portion, the second portion, and the upper and lower surfaces of the folding portion, respectively.

In an embodiment, concentrations of Na+ ions of the first portion, the second portion, and the upper and lower surfaces of the folding portion may satisfy $C_{NP-S1}(Na+)>C_{NP-S2}(Na+)>C_{FP}(Na+)$, where $C_{NP-S1}(Na+)$, $C_{NP-S2}(Na+)$, and $C_{FP}(Na+)$ may denote the concentrations of the Na+ ions of the first portion, the second portion, and the upper and lower surfaces of the folding portion, respectively.

In an embodiment, the folding portion between the first non-folding portion and the second non-folding portion may have a width greater than or equal to about 5 mm and less than or equal to about 30 mm.

In an embodiment, the recess portion may have a depth greater than or equal to about 50% and less than or equal to about 90% of a thickness of the non-folding portion.

According to one or more embodiments of the present disclosure, an electronic device includes: a display module including: a folding display portion configured to be folded relative to a folding axis extending in one direction; a first non-folding display portion; and a second non-folding display portion spaced from the first non-folding display portion with the folding display portion interposed therebetween; and a window on the display module, and including: a glass material; a folding portion corresponding to the folding display portion; a first non-folding portion corresponding to the first non-folding display portion; and a second non-folding portion corresponding to the second non-folding display portion. The first and second non-folding portions have a surface compressive stress less than a surface compressive stress of the folding portion.

In an embodiment, the window may include a lower surface and an upper surface opposite to the lower surface; a distance between the lower surface and the display module may be less than a distance between the upper surface and the display module; and a lower surface of the folding portion may have a recess portion defined therein.

In an embodiment, the electronic device may further include an adhesive layer filled between the display module and the window.

In an embodiment, when the display module and the window are folded, a distance between portions of an upper surface of the window that face each other may be smaller than a distance between portions of an upper surface of the display module that face each other.

In an embodiment, the folding portion may have a first surface compressive stress, and each of the first non-folding portion and the second non-folding portion may include: a first portion spaced from the folding portion, and having a second surface compressive stress smaller than the first surface compressive stress of the folding portion; and a second portion between the folding portion and the first portion, and having a surface compressive stress that decreases from the folding portion toward the first portion.

In an embodiment, the folding portion may include: a first compressive stress area exposed to an upper surface of the folding portion; a second compressive stress area exposed to a lower surface of the folding portion; and a base area between the first compressive stress area and the second compressive stress area. Each of the first compressive stress area and the second compressive stress area may have a concentration of K+ ions greater than a concentration of K+ ions of the base area.

In an embodiment, the first portion may include the base area, and may exclude the first compressive stress area and the second compressive stress area; the second portion may include the base area, the first compressive stress area, and the second compressive stress area; and the base area of the second portion may have a thickness that decreases from the folding portion toward the first portion.

In an embodiment, the concentrations of K+ ions of the first portion, the second portion, and the upper and lower surfaces of the folding portion may satisfy $C_{NP-S1}(K+)<C_{NP-S2}(K+)<C_{FP}(K+)$, where $C_{NP-S1}(K+)$, $C_{NP-S2}(K+)$, and $C_{FP}(K+)$ may denote the concentrations of K+ ions of the first portion, the second portion, and the upper and lower surfaces of the folding portion, respectively.

In an embodiment, concentrations of Na+ ions of the first portion, the second portion, and the upper and lower surfaces of the folding portion may satisfy $C_{NP-S1}(Na+)>C_{NP-S2}(Na+)>C_{FP}(Na+)$, where $C_{NP-S1}(Na+)$, $C_{NP-S2}(Na+)$, and $C_{FP}(Na+)$ may denote the concentrations of Na+ ions of the first portion, the second portion, and the upper and lower surfaces of the folding portion, respectively.

According to one or more embodiments of the present disclosure, a method of manufacturing a window, includes: providing a base glass including a folding portion, and a non-folding portion adjacent to the folding portion; providing a strengthening salt paste to the base glass; heat-treating the strengthening salt paste; and cleaning the strengthening salt paste after the heat-treating. The strengthening salt paste is provided to only the folding portion, or is provided to the folding portion and the non-folding portion at different concentrations of K+ ions from each other.

In an embodiment, the folding portion may have a recess portion defined therein.

In an embodiment, the strengthening salt paste may include distilled water, viscosity control particles, and a strengthening salt including KNOB.

In an embodiment, the viscosity control particles may include at least one of $Al_2O_3$, $SiO_2$, or ZnO.

In an embodiment, the base glass may include an upper surface and a lower surface opposite to the upper surface, the recess portion may be recessed from the lower surface of the base glass toward the upper surface of the base glass, and the upper surface of the folding portion may be a flat surface.

In an embodiment, the strengthening salt paste may be provided to each of the upper surface and the lower surface of the folding portion, and may not be provided to the non-folding portion.

In an embodiment, the non-folding portion may include: a first portion spaced from the folding portion; and a second portion between the first portion and the folding portion, and the providing of the strengthening salt paste may include providing the strengthening salt paste to the first portion, the second portion, and the folding portion at different concentrations of K+ ions from each other.

In an embodiment, the providing of the strengthening salt paste may include providing first, second, and third strengthening salt pastes to the first portion, the second portion, and the folding portion, respectively, and the first and second strengthening salt pastes may further include $NaNO_3$ as the strengthening salt.

In an embodiment, a weight ratio of KNOB to $NaNO_3$ in first, second, and third strengthening salt pastes may satisfies $KNO_3:NaNO_3=(100-X)\%:X\%$, where: X may denote the weight ratio of $NaNO_3$ to the strengthening salt included in the strengthening salt paste; when X of the first strengthening salt paste, X of the second strengthening salt paste, and X of the third strengthening salt paste correspond to X1, X2, and X3, respectively, X1, X2, and X3 may satisfy X1>X2>X3; and X may be greater than or equal to zero (0) and less than or equal to about 50.

In an embodiment, a difference between X1 and X2 may be equal to or greater than about 5%, and a difference between X2 and X3 may be equal to or greater than about 5%.

In an embodiment, X3 may be zero (0), and the difference between X1 and X2 may be equal to or greater than about 5%.

In an embodiment, the heat-treating of the strengthening salt paste may be carried out at a temperature greater than or equal to about 365° C. and less than or equal to about 400° C.

According to one or more embodiments of the present disclosure, the folding portion and the non-folding portion of the window may have different compressive stress characteristics, and thus, the window may have excellent folding characteristics and impact resistance.

According to one or more embodiments of the present disclosure, the electronic device may include the window disposed on the display module, and the window may include the folding portion and the non-folding portion, which may have different compressive stress characteristics from each other, and thus, the electronic device may have excellent folding characteristics and impact resistance.

According to one or more embodiments of the present disclosure, the manufacturing method of the window may include providing the strengthening salt paste onto the base glass where the folding portion (e.g., where only the folding portion) is selectively and chemically strengthened, and thus, the window having excellent folding characteristics and impact resistance may be provided.

BRIEF DESCRIPTION OF THE DRAWINGS

The above and other aspects and features of the present disclosure will be more clearly understood from the following detailed description of the illustrative, non-limiting embodiments with reference to the accompanying drawings, wherein:

FIG. 8 is a flowchart showing a method of manufacturing a window according to an embodiment of the present disclosure;

FIG. 9B is a cross-sectional view showing a process of a method of manufacturing a window according to an embodiment of the present disclosure;

DETAILED DESCRIPTION

Figure 1A:
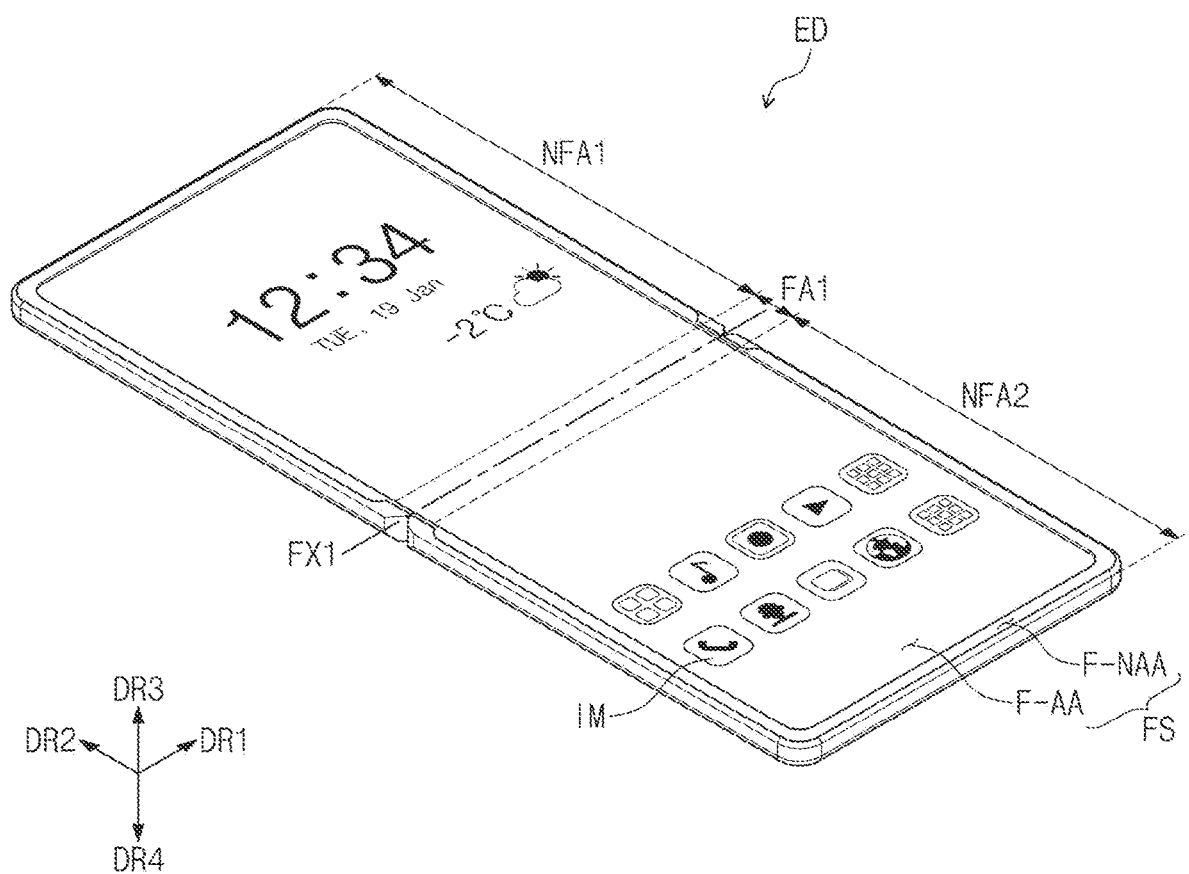
FIG. 1A is a perspective view showing an electronic device in an unfolded state according to an embodiment of the present disclosure.

Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, redundant description thereof may not be repeated.

When a certain embodiment may be implemented differently, a specific process order may be different from the described order. For example, two consecutively described processes may be performed at the same or substantially at the same time, or may be performed in an order opposite to the described order.

In the drawings, the relative sizes of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s)

as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. Similarly, when a layer, an area, or an element is referred to as being "electrically connected" to another layer, area, or element, it may be directly electrically connected to the other layer, area, or element, and/or may be indirectly electrically connected with one or more intervening layers, areas, or elements therebetween. In addition, it will also be understood that when an element or layer is referred to as being "between" two elements or layers, it can be the only element or layer between the two elements or layers, or one or more intervening elements or layers may also be present. On the other hand, the expression "directly disposed" means that no intervening element, such as a layer, a film, an area, or a plate, is between the element or layer and the other element or layer. For example, the expression "directly disposed" means that two layers or two members are disposed with no additional member, such as an adhesive member, therebetween.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, the expression "A and/or B" denotes A, B, or A and B. Expressions such as "at least one of," when preceding a list of elements, modify the entire list of elements and do not modify the individual elements of the list. For example, the expression "at least one of a, b, or c" indicates only a, only b, only c, both a and b, both a and c, both b and c, all of a, b, and c, or variations thereof.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Hereinafter, a window, an electronic device, and a method of manufacturing the window according to embodiments of the present disclosure will be described in more detail with reference to the accompanying drawings.

Figure 1B:
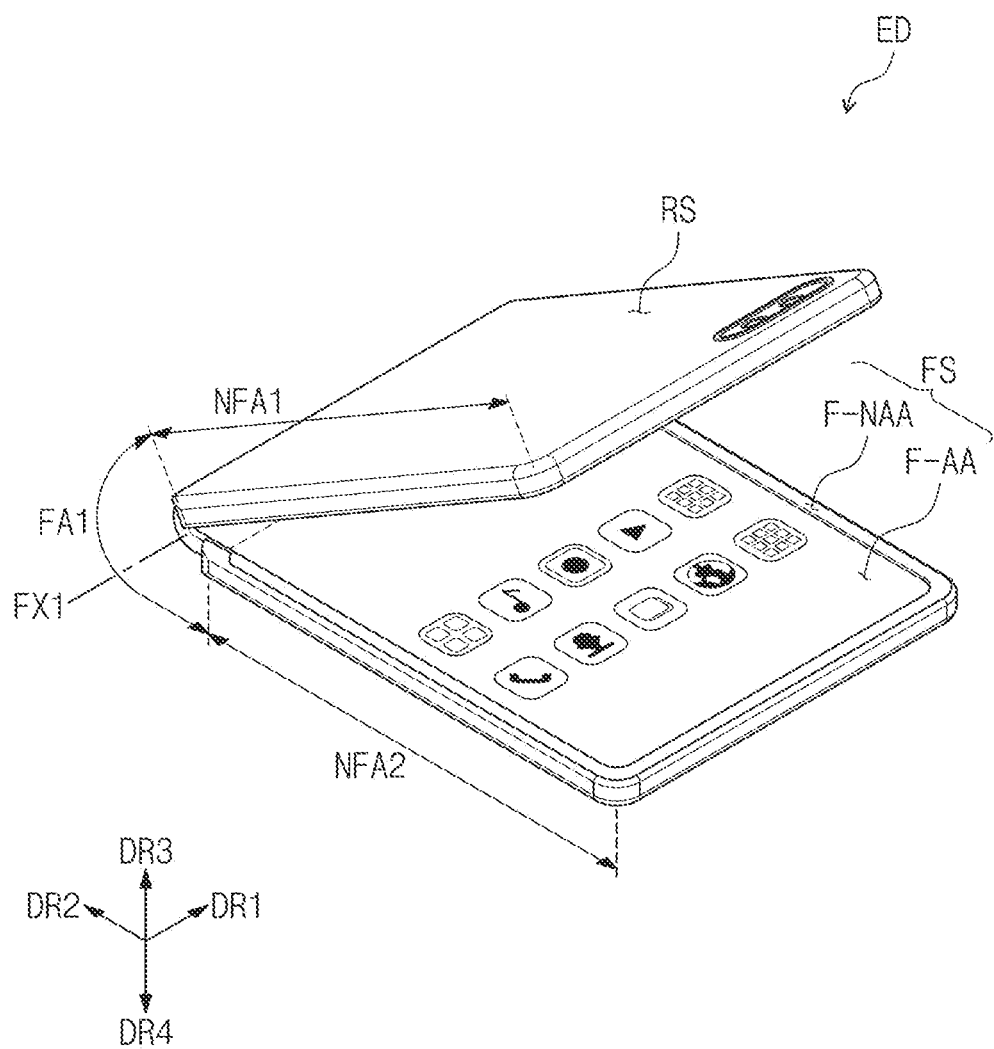
FIG. 1B is a perspective view showing the electronic device of FIG. 1A being inwardly folded according to an embodiment of the present disclosure.

FIG. 1A is a perspective view showing an electronic device ED in an unfolded state according to an embodiment of the present disclosure. FIG. 1B is a perspective view showing the electronic device ED of FIG. 1A being inwardly folded according to an embodiment of the present disclosure. The electronic device ED may be a device that is activated in response to electrical signals. As an example, the electronic device ED may include (e.g., may be) a mobile phone, a tablet computer, a car navigation unit (e.g., a navigation device), a game unit (e.g., a game console), a wearable device, or the like. However, the present disclosure is not limited thereto or thereby. For convenience of illustration, FIG. 1A shows a mobile phone as a representative example of the electronic device ED.

In the figures, first, second, third, and fourth directional axes DR1, DR2, DR3, and DR4 are shown, but the directions indicated by the first, second, third, and fourth directional axes DR1, DR2, DR3, and DR4 may be relative to each other, and may be variously modified to other suitable directions. In addition, the directions indicated by the first, second, third, and fourth directional axes DR1, DR2, DR3, and DR4 may be referred to as first, second, third, and fourth directions, respectively, and may be assigned with the same reference symbols as those of the first, second, third, and fourth directional axes DR1, DR2, DR3, and DR4.

Referring to FIGS. 1A and 1B, the electronic device ED may include a display surface FS defined by the first directional axis DR1 and the second directional axis DR2 crossing the first directional axis DR1. The electronic device ED may provide an image IM through the display surface FS to a user. According to an embodiment, the electronic device ED may display the image IM through the display surface FS toward the third directional axis DR3, which is parallel to or substantially parallel to each of the first directional axis DR1 and the second directional axis DR2. In the present embodiment, a front surface (or an upper surface) and a rear surface (or a lower surface) of each member of the electronic device ED may be defined with respect to a direction in which the image IM is displayed. In the present disclosure, the direction in which the image IM is displayed may be referred to as the third directional axis (or the third direction)

DR3, and the fourth directional axis DR4 may be defined as a direction opposite to the direction indicated by the third directional axis DR3.

The electronic device ED may sense an external input applied thereto from the outside. The external input may include inputs of various suitable forms that are provided from the outside of the electronic device ED. For example, the external input may include an input in proximity to or approaching close to the electronic device ED at a suitable distance (e.g., a predetermined distance), for example, such as a hovering input, as well as a touch input by a user's body (e.g., a hand or a finger of the user). In addition, the external input may include various suitable forms, for example, such as force, pressure, temperature, or light.

The display surface FS of the electronic device ED may include an active area F-AA and a peripheral area F-NAA. The active area F-AA may be activated in response to the electrical signals. The electronic device ED may display the image IM through the active area F-AA, and various suitable external inputs may be sensed through the active area F-AA. The peripheral area F-NAA may be adjacent to the active area F-AA. For example, the peripheral area F-NAA may surround (e.g., around a periphery of) the active area F-AA. The peripheral area F-NAA may have a suitable color (e.g., a predetermined color). Accordingly, the active area F-AA may have a shape that is defined or substantially defined by the peripheral area F-NAA, but this is merely one example, and the present disclosure is not limited thereto. For example, in other embodiments, the peripheral area F-NAA may partially surround (e.g., around a portion of the periphery of) the active area F-AA, such that the peripheral area F-NAA may be adjacent to only one, two, or three sides of the active area F-AA, or the peripheral area F-NAA may be omitted as needed or desired. According to an embodiment, the active area of the electronic device ED may have a variety of suitable shapes, and thus, is not particularly limited.

The electronic device ED may include a folding area FA1, and non-folding areas NFA1 and NFA2. The electronic device ED may include a plurality of non-folding areas NFA1 and NFA2. The electronic device ED may include a first non-folding area NFA1, and a second non-folding area NFA2 spaced apart from the first non-folding area NFA1 with the folding area FA1 interposed therebetween. While FIGS. 1A and 1B show the electronic device ED including one folding area FA1 as a representative example, the present disclosure is not limited thereto or thereby. According to an embodiment, the electronic device ED may include a plurality of folding areas.

Still referring to FIGS. 1A and 1B, the electronic device ED may be folded with respect to a first folding axis FX1. The first folding axis FX1 may be an imaginary axis (e.g., a virtual axis) extending in the first directional axis DR1, and the first folding axis FX1 may be parallel to or substantially parallel to a short side extending direction of the electronic device ED. For example, the first folding axis FX1 may extend along the first directional axis DR1 on the display surface FS.

According to an embodiment, the non-folding areas NFA1 and NFA2 may be disposed adjacent to the folding area FA1, such that the folding area FA1 is disposed between the non-folding areas NFA1 and NFA2. As an example, the first non-folding area NFA1 may be disposed adjacent to one side of the folding area FA1 in the second direction DR2, and the second non-folding area NFA2 may be disposed adjacent to another side (e.g., an opposite side) of the folding area FA1 in the second direction DR2.

The electronic device ED may be folded with respect to the first folding axis FX1, and may be in an inwardly folded (e.g., in-folding) state in which an area overlapping with the first non-folding area NFA1 of the display surface FS faces an area overlapping with the second non-folding area NFA2.

However, the present disclosure is not limited thereto or thereby, and according to an embodiment, the electronic device may be folded about a plurality of folding axes to allow portions of the display surface FS to face each other, and the number of the folding axes and the number of the non-folding areas are not particularly limited.

According to an embodiment, the active area F-AA or a rear surface RS of the electronic device ED may include an electronic module area. Various suitable electronic modules (e.g., electronic devices or electronic sensors) may be disposed in the electronic module area. As an example, the electronic modules may include at least one of a camera, a speaker, an optical sensor, or a heat sensor.

Figure 1C:
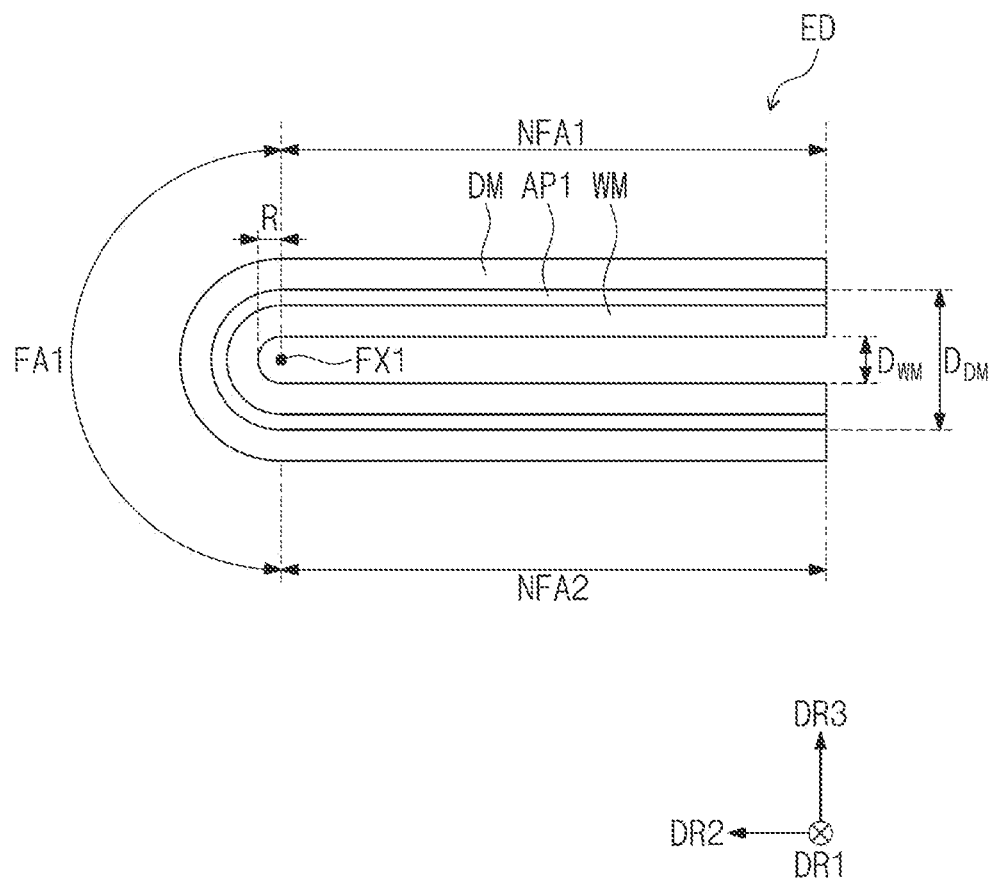
FIG. 1C is a cross-sectional view showing an electronic device in a folded state according to an embodiment of the present disclosure.

FIG. 1C is a cross-sectional view showing the electronic device ED in a folded state according to an embodiment of the present disclosure. In the folded state of the electronic device ED, a distance DWM between portions of an upper surface of a window WM, which face each other, may be smaller than a distance DDM between portions of an upper surface of a display module (e.g., a display or a display layer) DM, which face each other. A radius of curvature R of the folding area FA1 of the electronic device ED with respect to the first folding axis FX1 may be, for example, equal to or greater than about 1 mm.

Figure 1D:
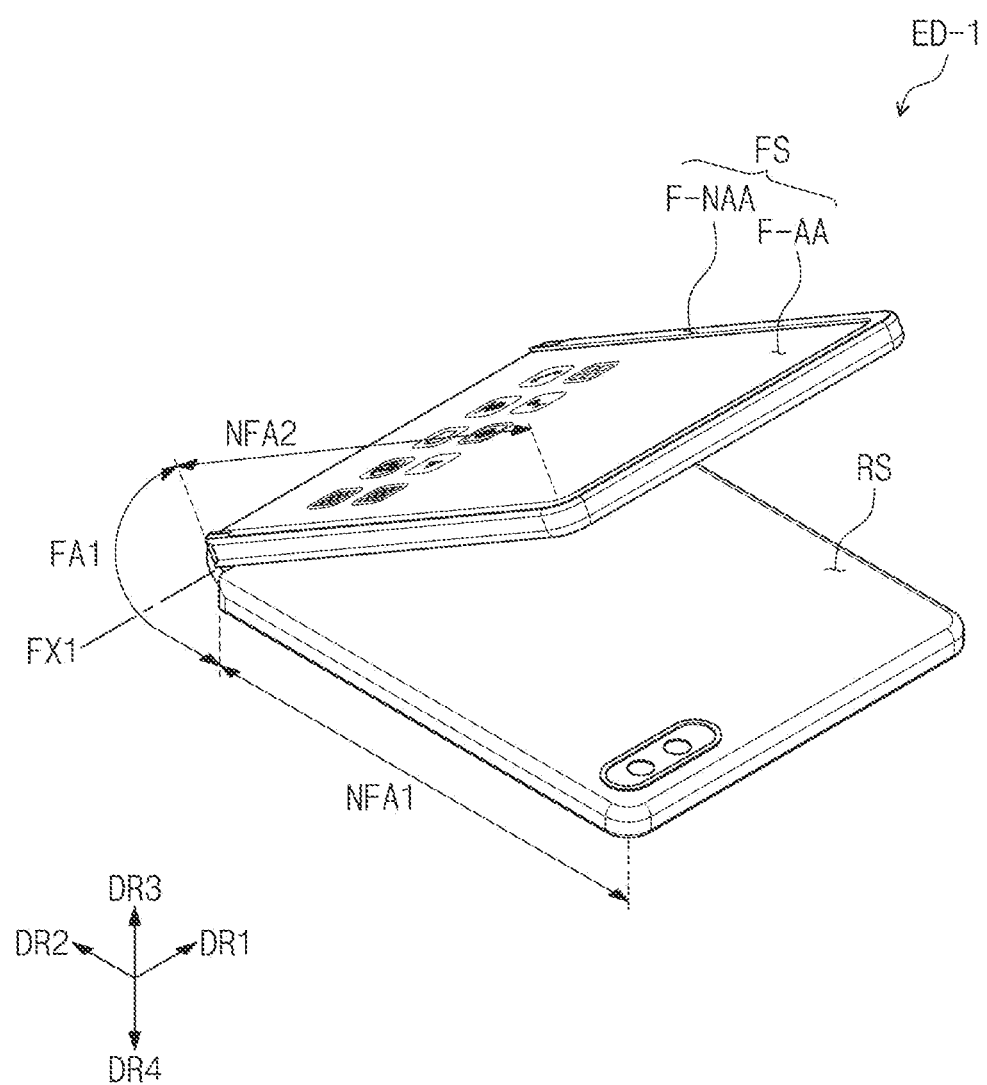
FIG. 1D is a perspective view showing an electronic device being outwardly folded according to an embodiment of the present disclosure.

However, the present disclosure is not limited to the inwardly folded state, and according to an embodiment, the electronic device may be operated in an outwardly folded (e.g., out-folding) state. FIG. 1D is a perspective view showing an electronic device ED-1 being outwardly folded according to an embodiment of the present disclosure. The electronic device ED-1 may include a folding area FA1, and non-folding areas NFA1 and NFA2.

The electronic device ED-1 may be folded with respect to a first folding axis FX1, and may be in the outwardly folded state such that an area overlapping with a first non-folding area NFA1 of the rear surface (e.g., a second display surface) RS faces an area overlapping with a second non-folding area NFA2 of the rear surface RS. When the electronic device ED-1 shown in FIG. 1D is folded (e.g., fully folded), a distance between portions of an upper surface of a display module may be smaller than a distance between portions of an upper surface of a window in the electronic device ED-1.

Figure 2A:
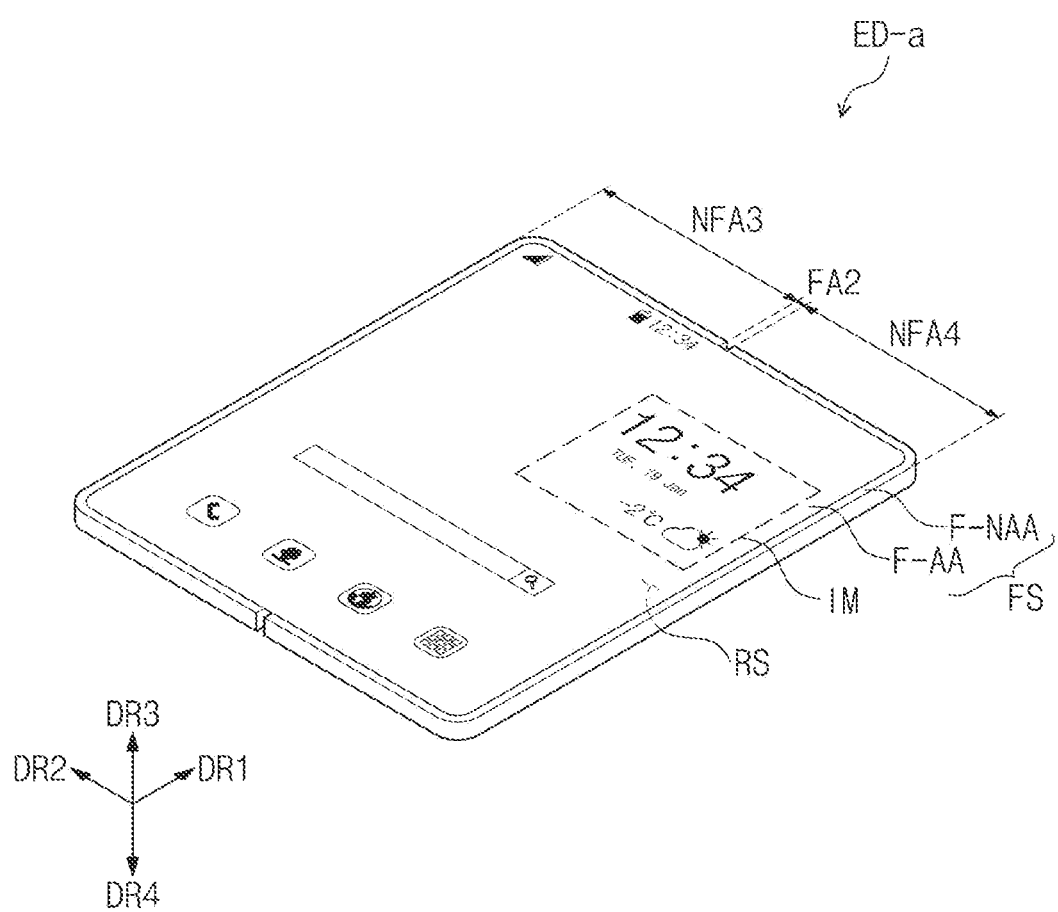
FIG. 2A is a perspective view showing an electronic device in an unfolded state according to an embodiment of the present disclosure.
Figure 2B:
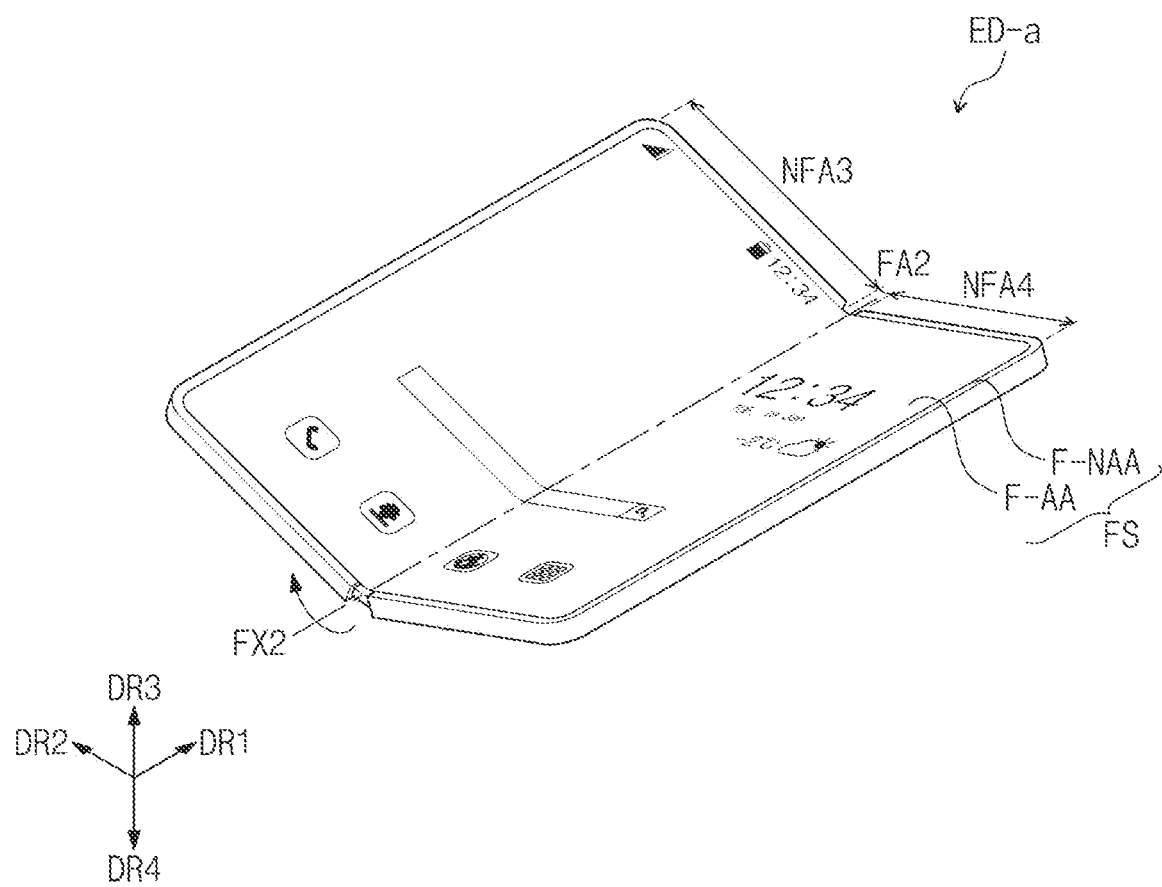
FIG. 2B is a perspective view showing the electronic device of FIG. 2A being inwardly folded according to an embodiment of the present disclosure.

FIG. 2A is a perspective view showing an electronic device ED-a in an unfolded state according to an embodiment of the present disclosure. FIG. 2B is a perspective view showing the electronic device ED-a of FIG. 2A being inwardly folded according to an embodiment of the present disclosure.

The electronic device ED-a may be folded with respect to a second folding axis FX2 extending in a direction parallel to or substantially parallel to the first directional axis DR1. In FIG. 2B, the second folding axis FX2 extends parallel to or substantially parallel to a direction in which a long side of the electronic device ED-a extends, but the present disclosure is not limited thereto or thereby.

According to an embodiment, the electronic device ED-a may include at least one folding area FA2, and non-folding areas NFA3 and NFA4 adjacent to the folding area FA2. The non-folding areas NFA3 and NFA4 may be spaced apart from each other with the folding area FA2 interposed therebetween.

The folding area FA2 may have a suitable curvature (e.g., a predetermined curvature) and a radius of curvature. According to an embodiment, a first non-folding area NFA3 and a second non-folding area NFA4 may face each other, and the electronic device ED-a may be inwardly folded (e.g., in-folding), such that a display surface FS is not exposed to the outside.

According to an embodiment, the display surface FS may be viewed by a user in the unfolded state of the electronic device ED-a. Similar to the electronic device ED described above with reference to FIGS. 1A and 1B, the display surface FS of the electronic device ED-a may include an active area F-AA and a peripheral area F-NAA. In addition, the display surface FS of the electronic device ED-a may include an electronic module area.

In addition, a rear surface RS of the electronic device ED-a may be viewed by the user in the inwardly folded (e.g., in-folding) state of the electronic device ED-a. As an example, the rear surface RS may serve as a second display surface for displaying images. Further, the rear surface RS may include an electronic module area in which an electronic module (e.g., an electronic device or an electronic sensor) including various suitable components is disposed.

Figure 2C:
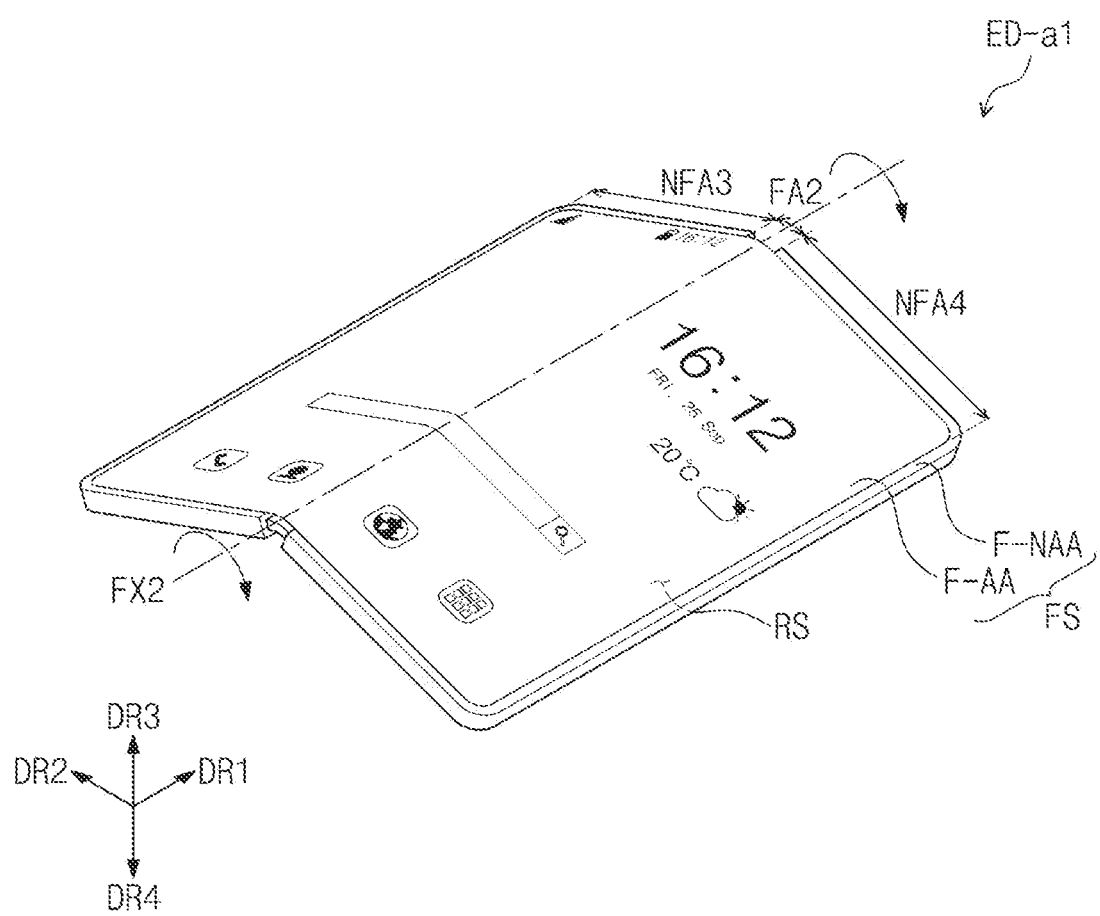
FIG. 2C is a perspective view showing an electronic device being outwardly folded according to an embodiment of the present disclosure.

However, the present disclosure is not limited to the inwardly folded state, and according to an embodiment, unlike the electronic device ED-a shown in FIGS. 2A and 2B, the electronic device may be operated in an outwardly folded (e.g., out-folding) state. FIG. 2C is a perspective view showing an electronic device ED-a1 being outwardly folded according to an embodiment. The electronic device ED-a1 may include a folding area FA2, and non-folding areas NFA3 and NFA4.

The electronic device ED-a1 may be folded with respect to a second folding axis FX2, and may be in the outwardly folded (e.g., out-folding) state in which an area overlapping with a first non-folding area NFA3 of a second display surface (or the rear surface) RS faces an area overlapping with a second non-folding area NFA4.

Figure 3:
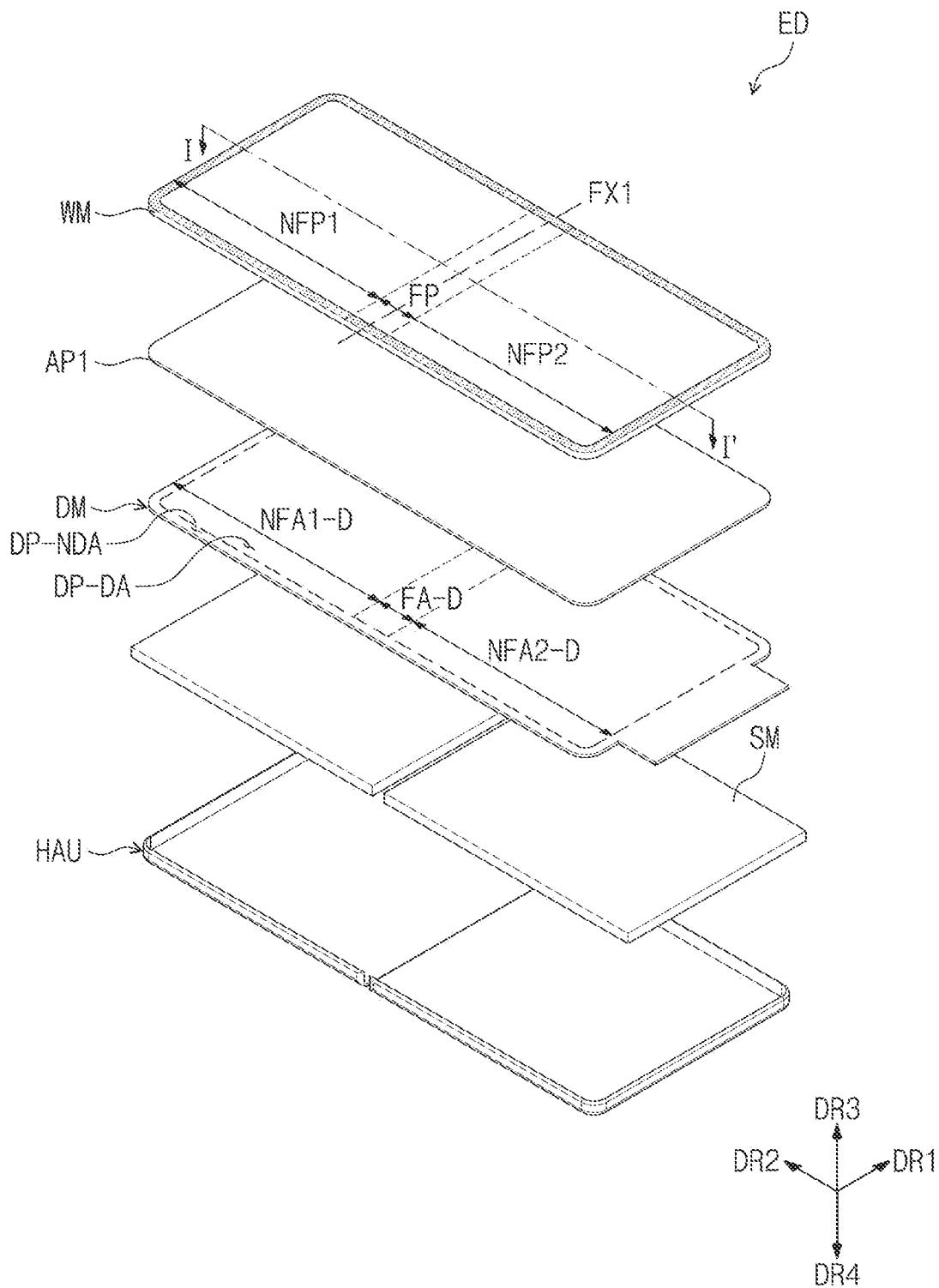
FIG. 3 is an exploded perspective view showing an electronic device according to an embodiment of the present disclosure.
Figure 4:
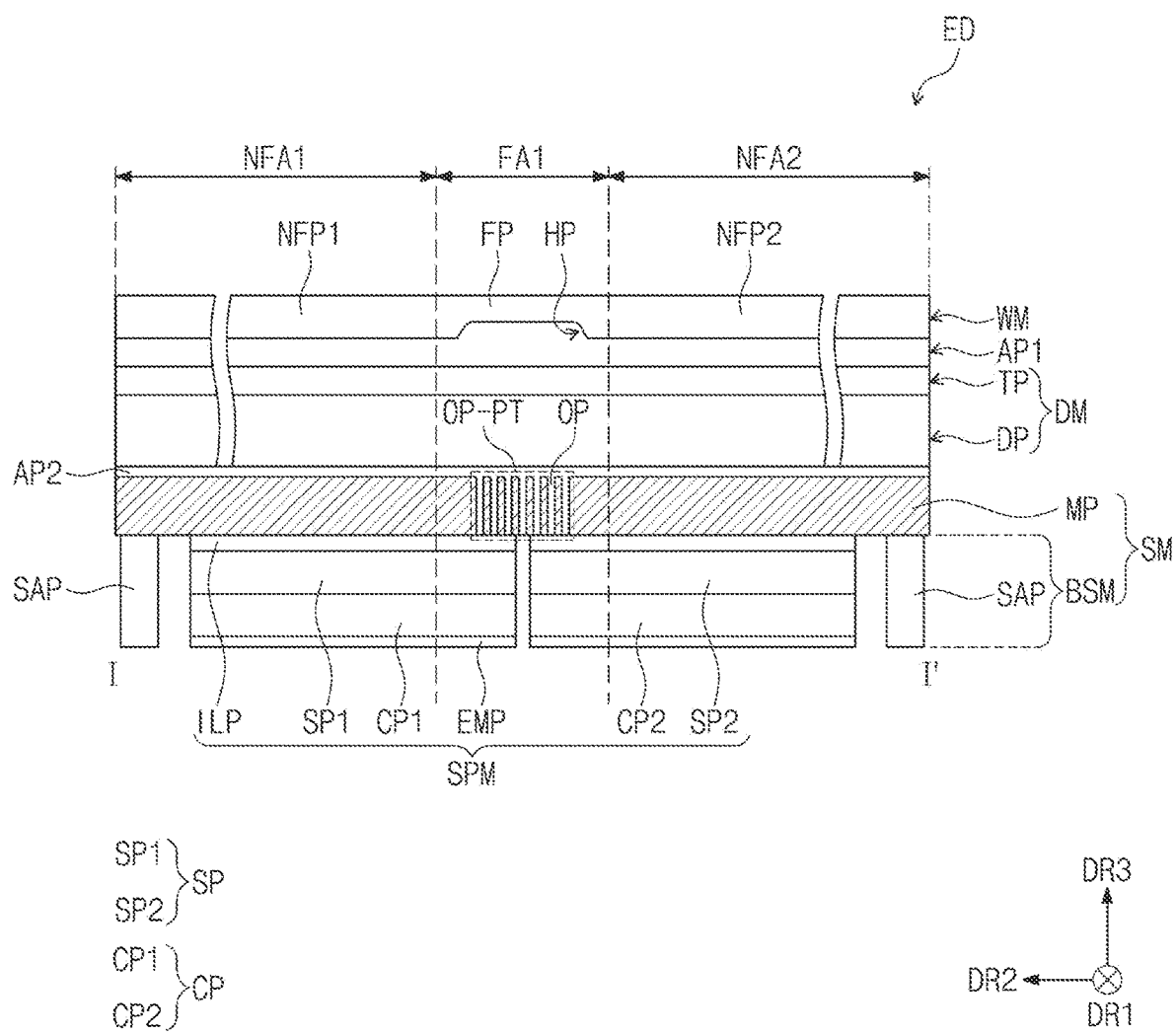
FIG. 4 is a cross-sectional view showing an electronic device according to an embodiment of the present disclosure.

FIG. 3 is an exploded perspective view showing the electronic device ED according to an embodiment of the present disclosure, and FIG. 4 is a cross-sectional view showing the electronic device ED according to an embodiment of the present disclosure. FIG. 3 is an exploded perspective view of the electronic device ED shown in FIG. 1A. FIG. 4 is a cross-sectional view taken along the line I-I' of FIG. 3.

Referring to FIGS. 3 and 4, the electronic device ED may include a display module (e.g., a display or a display layer) DM, and a window WM disposed on the display module DM. In addition, the electronic device ED may further include an adhesive layer AP1 disposed between the display module DM and the window WM. The electronic device ED may include a lower module (e.g., a lower layer or a lower support layer) SM disposed under (e.g., underneath) the display module DM.

The window WM may cover (e.g., may entirely cover) an upper surface of the display module DM. The window WM may have a shape corresponding to a shape of the display module DM. In addition, the electronic device ED may include a housing HAU accommodating the display module DM and the lower module SM. The housing HAU may be connected to (e.g., attached to or coupled with) the window WM. In some embodiments, the housing HAU may further include a hinge structure to allow the electronic device ED to be easily folded and/or bent. The window WM may be a cover window disposed on the display module DM.

According to an embodiment, the window WM of the electronic device ED may include an optically transparent insulating material. For example, the window WM may be formed of a glass material. The window WM may include (e.g., may be) a glass substrate, but the present disclosure is not limited thereto. As an example, the window WM may be the glass substrate of which at least a portion thereof is chemically strengthened. According to an embodiment, the window WM may be formed of the glass material, and may be used as the cover window for the electronic device ED.

In the electronic device ED, the adhesive layer AP1 disposed between the window WM and the display module DM may be filled between the window WM and the display module DM. The adhesive layer AP1 may be filled in a recess portion HP defined in one surface of the window WM. According to an embodiment, the one surface of the window WM in which the recess portion HP is defined may be a surface facing (e.g., adjacent to) the display module DM.

The adhesive layer AP1 may be an optically clear adhesive film (OCA) or an optically clear adhesive resin layer (OCR). However, the present disclosure is not limited thereto, and in some embodiments, the adhesive layer AP1 may be omitted as needed or desired.

The display module DM may display the image in response to electrical signals, and may transmit/receive information about the external input. The display module DM may include a display area DP-DA and a non-display area DP-NDA. The display area DP-DA may be defined as an area through which the image provided from the display module DM is transmitted.

The non-display area DP-NDA may be adjacent to the display area DP-DA. As an example, the non-display area DP-NDA may surround (e.g., around a periphery of) the display area DP-DA. However, this is merely one example, and the non-display area DP-NDA may be defined in various suitable shapes and should not be particularly limited. According to an embodiment, the display area DP-DA of the display module DM may correspond to at least a portion of the active area F-AA (e.g., refer to FIG. 1A). The display module DM may include a display panel DP, and an input sensor TP disposed on the display panel DP.

The display module DM may include a folding display portion FA-D, and non-folding display portions NFA1-D and NFA2-D. The folding display portion FA-D may correspond to the folding area FA1 (e.g., refer to FIG. 1A), and the non-folding display portions NFA1-D and NFA2-D may correspond to the non-folding areas NFA1 and NFA2 (e.g., refer to FIG. 1A).

The folding display portion FA-D may be folded and/or bent with respect to the first folding axis FX1 extending in the first directional axis DR1. The display module DM may include a first non-folding display portion NFA1-D and a second non-folding display portion NFA2-D. The first non-folding display portion NFA1-D and the second non-folding display portion NFA2-D may be spaced apart from each other with the folding display portion FA-D interposed therebetween. The first non-folding display portion NFA1-D and the second non-folding display portion NFA2-D may be spaced apart from each other with the folding display portion FA-D interposed therebetween in the second directional axis DR2.

In the electronic device ED, the lower module SM may include a support plate MP and a lower support member BSM.

The support plate MP may be disposed under (e.g., underneath) the display module DM. According an embodiment, the support plate MP may include a metal material or a polymer material. As an example, the support plate MP may include stainless steel, aluminum, or any suitable alloys thereof. According to an embodiment, the support plate MP may be formed of a polymer material. The support plate MP may be provided with a plurality of openings OP defined therethrough. The support plate MP may include an opening pattern OP-PT through which the openings OP are defined.

A width in the second directional axis DR2 of a portion at (e.g., in or on) which the opening pattern OP-PT is defined on a plane defined by the second directional axis DR2 and the third directional axis DR3 may correspond to a width of the folding area FA1. In addition, a width of the recess portion HP of the window WM may correspond to the width of the folding area FA1, and the width of the recess portion HP of the window WM may correspond to the width in the second directional axis DR2 of the portion at (e.g., in or on) which the opening pattern OP-PT is defined.

The lower support member BSM may include a support member SPM and a filling portion SAP. The support member SPM may overlap with most portions of the display module DM. The filling portion SAP may be disposed outside (e.g., around a periphery of) the support member SPM, and may overlap with an outer portion of the display module DM.

The lower support member BSM may include at least one of a support layer SP, a cushion layer CP, a shielding layer EMP, or an interlayer adhesive layer ILP. However, a configuration of the lower support member BSM is not limited to the configuration shown in FIG. 4, and the configuration of the lower support member BSM may be variously modified according to (e.g., depending on) a size and/or a shape of the electronic device ED and/or operation characteristics of the electronic device ED. As an example, at least one of (e.g., some of) the support layer SP, the cushion layer CP, the shielding layer EMP, or the interlayer adhesive layer ILP may be omitted as needed or desired, a stacking order of the support layer SP, the cushion layer CP, the shielding layer EMP, and the interlayer adhesive layer ILP may be variously modified from that shown in FIG. 4, or other suitable components may be further included.

The support layer SP may include a metal material or a polymer material. The support layer SP may be disposed under (e.g., underneath) the support plate MP. As an example, the support layer SP may be a thin metal substrate.

The support layer SP may include a first sub-support layer SP1, and a second sub-support layer SP2 spaced apart from the first sub-support layer SP1 in the second directional axis DR2. The first sub-support layer SP1 and the second sub-support layer SP2 may be spaced apart from each other at (e.g., in or on) a portion corresponding to the first folding axis FX1. A separation distance between the first sub-support layer SP1 and the second sub-support layer SP2 may be smaller than the width of the recess portion HP in the second directional axis DR2.

As the support layer SP includes the first sub-support layer SP1 and the second sub-support layer SP2 spaced apart from the first sub-support layer SP1 at (e.g., in or on) the folding area FA1, the folding or bending characteristics of the electronic device ED may be improved.

The cushion layer CP may be disposed under (e.g., underneath) the support layer SP. The cushion layer CP may prevent or substantially prevent the support plate MP from being pressed and deformed (e.g., plastic-deformed) by an external impact and force. The cushion layer CP may improve an impact resistance of the electronic device ED. The cushion layer CP may include a sponge, a foam, or an elastomer, for example, such as a urethane resin. In addition, the cushion layer CP may include at least one of an acrylic-based polymer, a urethane-based polymer, a silicon-based polymer, or an imide-based polymer, but the present disclosure is not limited thereto or thereby.

In addition, the cushion layer CP may include a first sub-cushion layer CP1, and a second sub-cushion layer CP2 spaced apart from the first sub-cushion layer CP1 in the second directional axis DR2. The first sub-cushion layer CP1 and the second sub-cushion layer CP2 may be spaced apart from each other at (e.g., in or on) an area corresponding to the first folding axis FX1. A separation distance between the first sub-cushion layer CP1 and the second sub-cushion layer CP2 may be smaller than the width in the second directional axis DR2 of the recess portion HP. As the cushion layer CP includes the first sub-cushion layer CP1 and the second sub-cushion layer CP2 spaced apart from the first sub-cushion layer CP1 at (e.g., in or on) the folding area FA1, the folding and/or bending characteristics of the electronic device ED may be improved.

The shielding layer EMP may include (e.g., may be) an electromagnetic shielding layer or a heat dissipation layer. In addition, the shielding layer EMP may perform a function of an adhesive layer. The interlayer adhesive layer ILP may attach the support plate MP to the lower support member BSM (e.g., to the support layer SP thereof). The interlayer adhesive layer ILP may be provided in the form of an adhesive resin layer or an adhesive tape. FIG. 4 shows a structure in which the interlayer adhesive layer ILP is divided into two portions that are spaced apart from each other at (e.g., in or on) an area corresponding to the first folding axis FX1, but the present disclosure is not limited thereto or thereby. For example, in other embodiments, the interlayer adhesive layer ILP may be provided in the form of a single layer without being divided at (e.g., in or on) the folding area FA1.

The filling portion SAP may be disposed outside the support layer SP and the cushion layer CP. The filling portion SAP may be disposed between the support plate MP and the housing HAU. The filling portion SAP may be filled in a space between the support plate MP and the housing HAU, and may fix the support plate MP.

In addition, the electronic device ED may further include an adhesive layer AP2 between the display module DM and the lower module SM. The adhesive layer AP2 may be an optically clear adhesive film (OCA) or an optically clear adhesive resin layer (OCR). In some embodiments, an adhesive layer may be further disposed between the members included in the lower module SM.

Figure 5:
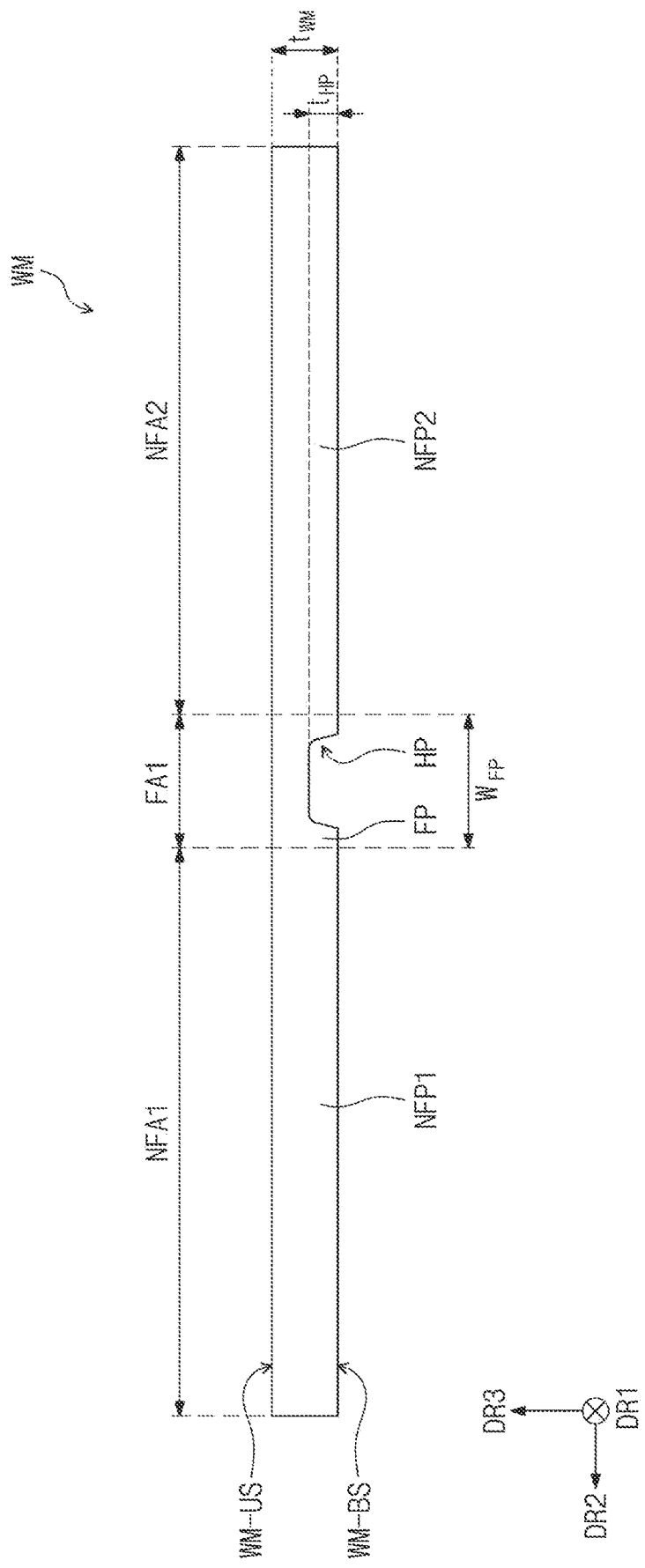
FIG. 5 is a cross-sectional view showing a window according to an embodiment of the present disclosure.

FIG. 5 is a cross-sectional view showing the window WM according to an embodiment of the present disclosure. Referring to FIGS. 4 and 5, the window WM may include a folding portion FP, and non-folding portions NFP1 and NFP2. The folding portion FP may correspond to the folding area FA1 of the electronic device ED. The folding portion FP of the window WM may correspond to the folding display portion FA-D of the display module DM.

The folding portion FP of the window WM may be folded with respect to the first folding axis FX1 (e.g., refer to FIG. 3) that is the imaginary folding axis extending in one direction. A first non-folding portion NFP1 and a second non-folding portion NFP2 may be spaced apart from each other with the folding portion FP interposed therebetween. The folding portion FP may be folded with respect to the folding axis FX1 (e.g., refer to FIG. 3) extending in the first direction DR1, and the first non-folding portion NFP1 and the second non-folding portion NFP2 may be spaced apart from each other with the folding portion FP interposed therebetween in the second direction DR2 that is perpendicular to or substantially perpendicular to the first direction DR1. According to an embodiment, a width WFP in the second directional axis DR2 of the folding portion FP of the window WM may be greater than or equal to about 5 mm and less than or equal to about 30 mm.

The window WM may include an upper surface WM-US, and a lower surface WM-BS opposite to the upper surface WM-US. The recess portion HP may be concavely recessed from the lower surface WM-BS of the window WM, which faces (e.g., is adjacent to) the display module DM, in a direction toward the upper surface WM-US, which is spaced apart from the display module DM. In other words, the recess portion HP may be defined in an area of the lower surface WM-BS of the window WM corresponding to the folding portion FP.

The recess portion HP may have a depth $t_{HP}$ that is greater than or equal to about 50% and less than or equal to about 90% of a thickness $t_{WM}$ of the window WM in the non-folding portions NFP1 and NFP2. In other words, a thickness of the folding portion FP in which the recess portion HP is defined in the window WM may be smaller than the thickness of the non-folding portions NFP1 and NFP2 of the window WM. According to an embodiment, the recess portion HP may be defined (e.g., may be formed) in the folding portion FP of the window WM through a slimming process.

As an example, the depth $t_{HP}$ of the recess portion HP in the window WM may be within a range from about 5 in to about 50 in. According to an embodiment, the depth $t_{HP}$ of the recess portion HP in the window WM may be about 30 in. When the depth $t_{HP}$ of the recess portion HP in the window WM is smaller than about 5 in, the folding operation characteristics of the window WM may be deteriorated. In addition, when the depth $t_{HP}$ of the recess portion HP in the window WM is greater than about 50 µm, the impact resistance of the window WM may be lowered.

The thickness $t_{WM}$ of the window WM may be greater than or equal to about 0.3 mm and less than or equal to about 1.0 mm. As an example, the thickness $t_{WM}$ of the window WM may be greater than or equal to about 0.7 mm and less than or equal to about 0.9 mm. As the window WM has the thickness that is greater than or equal to about 0.3 mm and less than or equal to about 1.0 mm, the window WM may be used as the cover window for the electronic devices ED and ED-a (e.g., refer to FIGS. 1A and 2A), and may allow the electronic devices to be slim and lightweight.

According to an embodiment, the lower surface WM-BS of the window in which the recess portion HP is defined may be disposed to be adjacent to the display module DM. In other words, in the electronic devices that may be inwardly folded, like the electronic devices ED and ED-a according to the embodiments described above with reference to FIGS. 1A to 1C and 2A and 2B, the recess portion HP of the window WM may be defined to correspond to the folding areas FA1 and FA2, and may be adjacent to the display module DM. According to an embodiment, the upper surface WM-US of the window WM may be the display surface FS (e.g., refer to FIG. 1A) of the electronic device ED, and may be a flat or substantially flat surface.

In other embodiments, unlike the electronic device ED shown in FIG. 4, in the electronic devices ED-1 and ED-a1 that may be outwardly folded, like those shown in FIGS. 1D and 2C, the recess portion HP of the window WM may be defined in the upper surface of the window WM that is spaced apart from the display module DM. In other words, the recess portion HP may be defined in a surface of the window WM, which may be exposed to the outside, in the electronic devices ED-1 and ED-a1 that are outwardly folded. In this case, the recess portion HP defined in the exposed surface, which may not be adjacent to the display module DM, of the window WM may be filled with a filling material, and a protective layer may be disposed on the upper surface of the window WM to protect the recess portion HP.

Figure 6A:
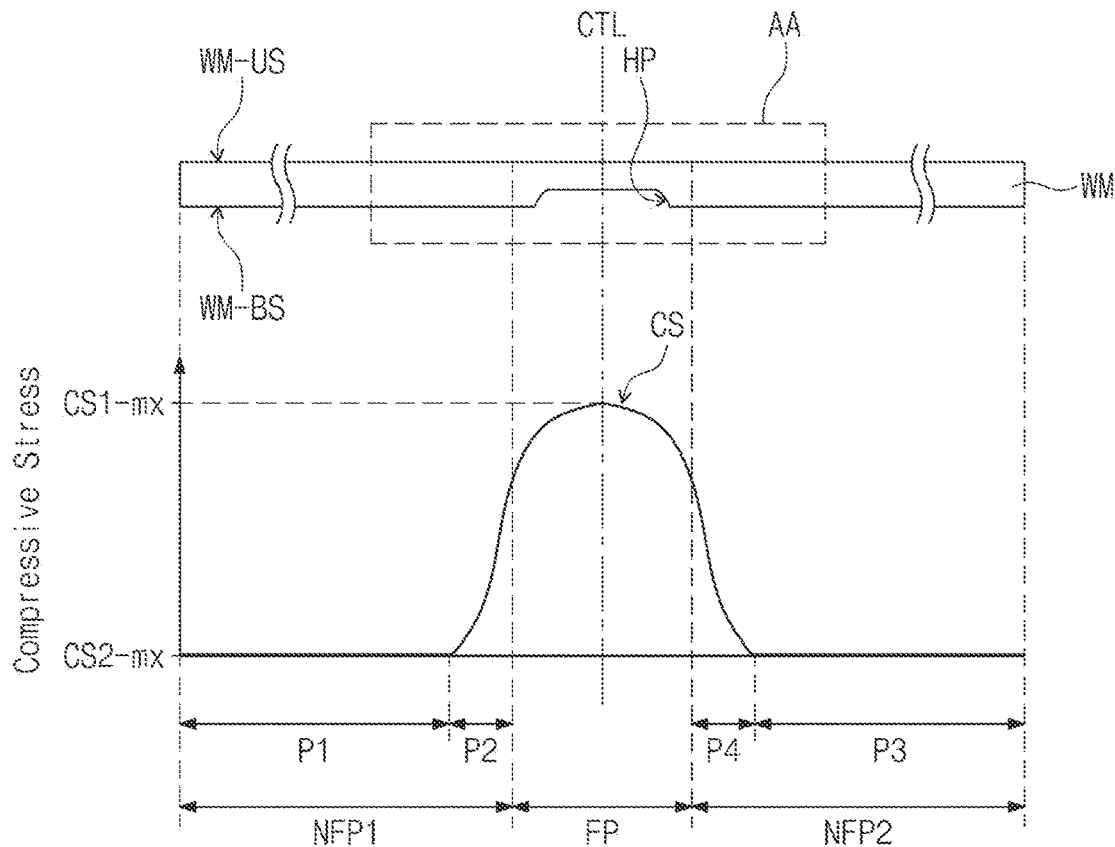
FIG. 6A is a view showing surface compressive stress characteristics of a window according to an embodiment of the present disclosure.
Figure 6B:
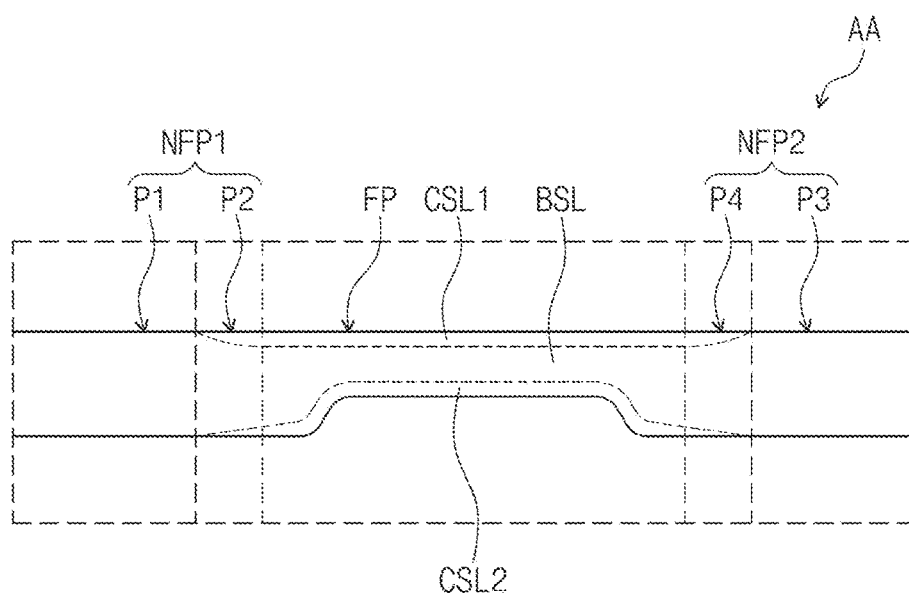
FIG. 6B is a cross-sectional view showing a portion of a window according to an embodiment of the present disclosure.
Figure 7A:
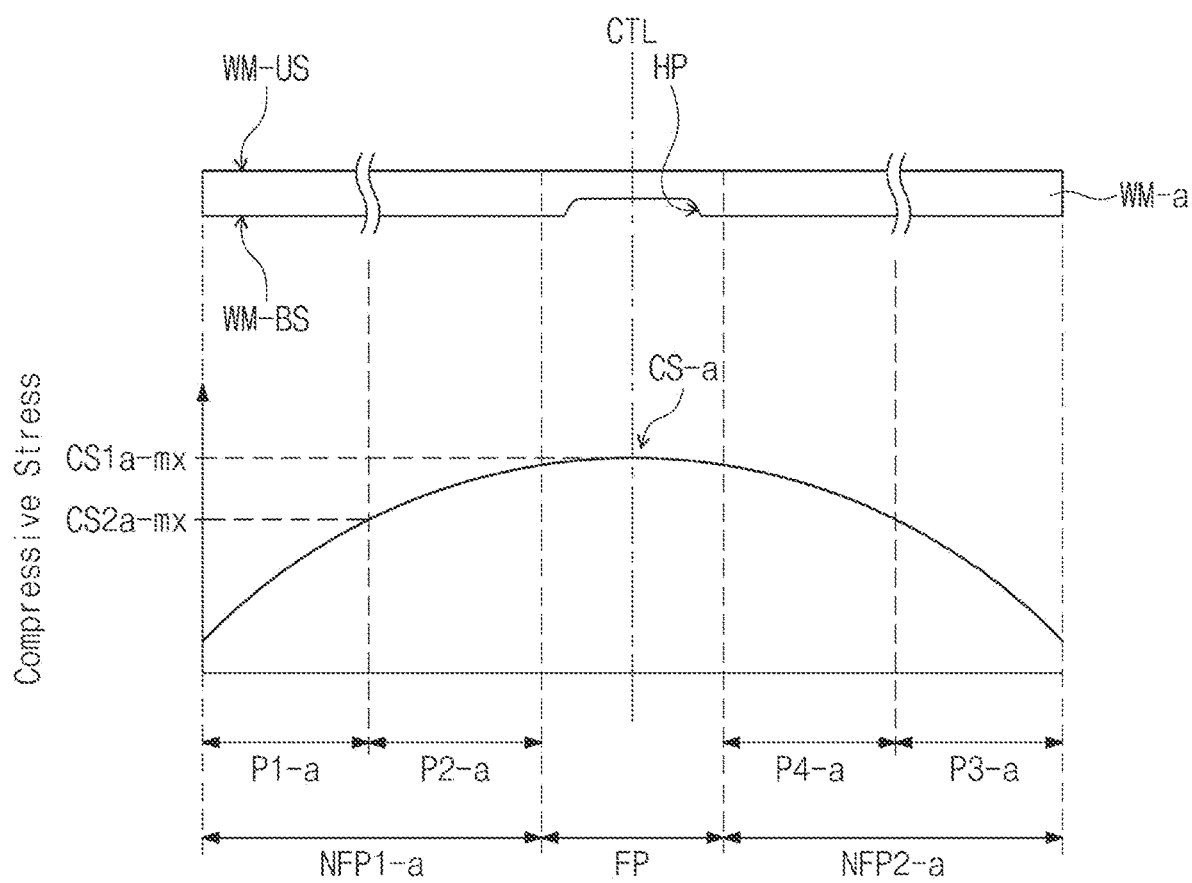
FIG. 7A is a view showing surface compressive stress characteristics of a window according to an embodiment of the present disclosure.
Figure 7B:
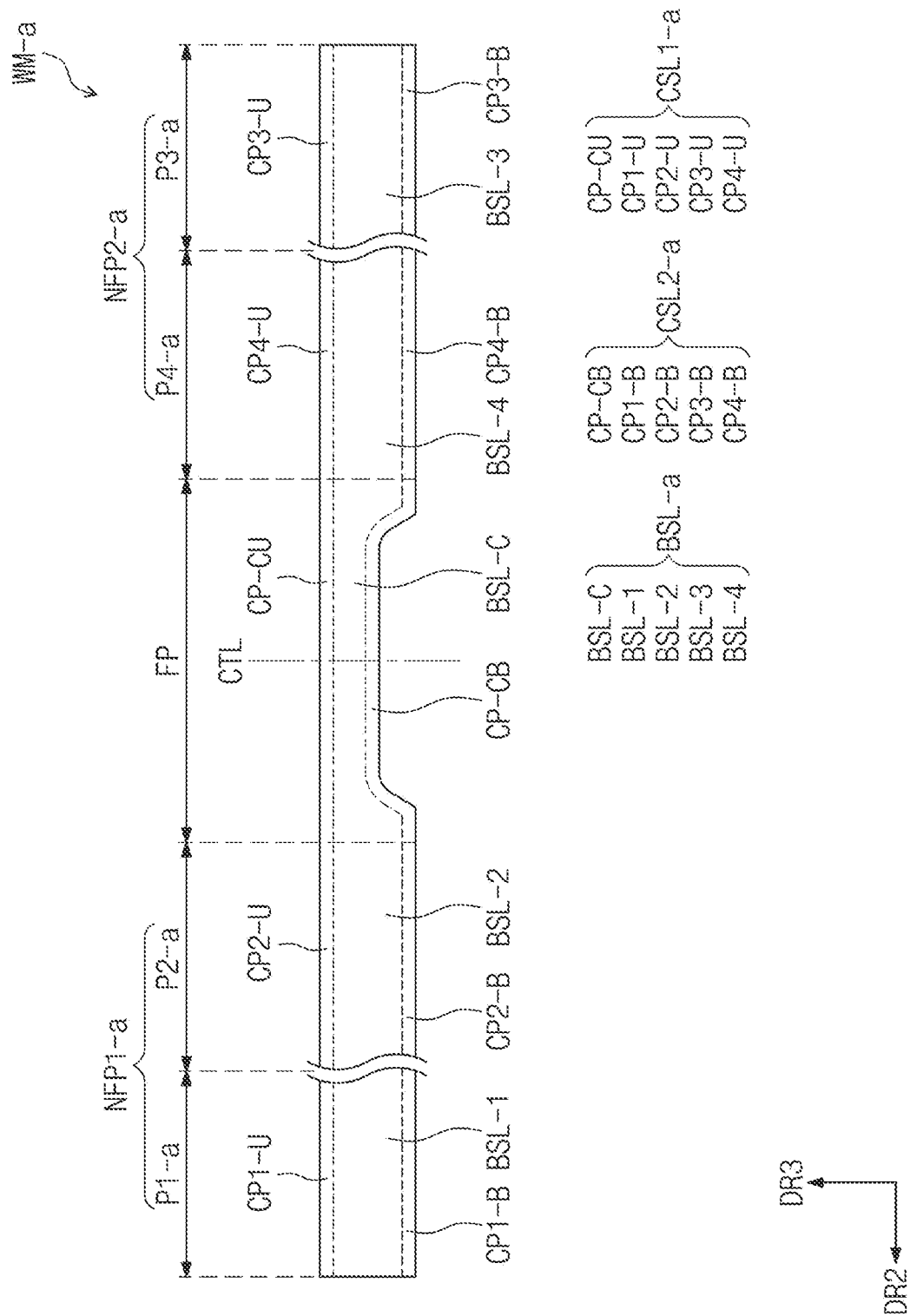
FIG. 7B is a cross-sectional view showing a portion of a window according to an embodiment of the present disclosure.

FIG. 6A is a view showing surface compressive stress characteristics of a window according to an embodiment of the present disclosure. FIG. 6B is a cross-sectional view showing a portion of the window according to an embodiment of the present disclosure. FIG. 6B is an enlarged cross-sectional view showing the portion AA of the window shown in FIG. 6A. FIG. 7A is a view showing surface compressive stress characteristics of a window according to an embodiment of the present disclosure. FIG. 7B is a cross-sectional view showing a portion of the window according to an embodiment of the present disclosure. FIG. 7B is an enlarged cross-sectional view of the window shown in FIG. 7A.

Hereinafter, for convenience, the window WM shown in FIGS. 6A to 7B will be described in more detail based on the shape of the window shown in FIGS. 1A and 1B. However, the present disclosure is not limited thereto or thereby, and the following description of the window WM may be applied to the window employed in the electronic device ED-a shown in FIGS. 2A and 2B. Further, the following description of the window may also be applied to the window employed in the electronic devices ED-1 and ED-1a in the outwardly folded state shown in FIGS. 1D and 2C.

FIG. 6A shows a compressive stress value according to positions in the window WM. The compressive stress value that is shown as a relative value in FIG. 6A indicates a surface compressive stress on a surface of the window WM.

Referring to FIGS. 6A and 6B, the window WM may include the folding portion FP, and the non-folding portions NFP1 and NFP2. The recess portion HP may be defined in one surface of the folding portion FP. The surface compressive stress of the non-folding portions NFP1 and NFP2 of the window WM may be smaller than the surface compressive stress of the folding portion FP.

The window WM may include a first compressive stress area CSL1 adjacent to the upper surface WM-US, and a second compressive stress area CSL2 adjacent to the lower surface WM-BS. In addition, the window WM may include a base area BSL disposed between the first compressive stress area CSL1 and the second compressive stress area CSL2.

The first compressive stress area CSL1 and the second compressive stress area CSL2 may be formed at (e.g., in or on) surfaces of the window WM to have a suitable depth (e.g., a predetermined depth) from the surfaces of the window WM in a thickness direction of the window WM. The compressive stress areas CSL1 and CSL2 may correspond to areas from the upper surface WM-US or the lower surface WM-BS of the window WM to a point where the compressive stress value becomes zero (0).

According to an embodiment, the compressive stress areas CSL1 and CSL2 may be portions where an ion exchange by a strengthening salt paste is performed in a window manufacturing method, which will be described in more detail below, and the base area BSL may be a portion where the ion exchange by the strengthening salt paste is not performed in the window manufacturing method. The base area BSL of the window WM may be a portion disposed between the compressive stress areas CSL1 and CSL2, or a portion forming the window WM without the compressive stress areas CSL1 and CSL2.

The compressive stress areas CSL1 and CSL2 may contain K+ ions. The base area BSL may not include the K+ ions, or may have a concentration of the K+ ions that is lower than a concentration of the K+ ions of each of the first compressive stress area CSL1 and the second compressive stress area CSL2.

In addition, the compressive stress areas CSL1 and CSL2 may contain the K+ ions and Na+ ions. The base area BSL may not contain the K+ ions and the Na+ ions substituted by the ion exchange. The base area BSL may not contain the K+ ions and may contain the Na+ ions, and the base area BSL may have a concentration of the K+ ions lower than a concentration of the K+ ions of each of the first compressive stress area CSL1 and the second compressive stress area CSL2. According to an embodiment, the base area BSL may contain the Na+ ions and the K+ ions, but the base area BSL may have the concentration of the K+ ions lower than the concentration of the K+ ions of each of the first compressive stress area CSL1 and the second compressive stress area CSL2, and may have a concentration of the Na+ ions lower than a concentration of the Na+ ions of each of the first compressive stress area CSL1 and the second compressive stress area CSL2.

According to an embodiment, the non-folding portions NFP1 and NFP2 may include first portions P1 and P3 spaced apart from the folding portion FP, and second portions P2 and P4 disposed between the first portions P1 and P3 and the folding portion FP. According to an embodiment, a second surface compressive stress in the first portions P1 and P3 may be smaller than a first surface compressive stress in the folding portion FP. In addition, a surface compressive stress of the second portions P2 and P4 may decrease toward the first portions P1 and P3 from the folding portion FP.

A maximum value CS1-$mx$ of the first surface compressive stress may be greater than a maximum value CS2-$mx$ of the second surface compressive stress. For example, the maximum value CS1-$mx$ of the first surface compressive stress in the folding portion FP may be equal to or greater than about 300 MPa, and the maximum value CS2-$mx$ of the second surface compressive stress in the first portions P1 and P3 may be equal to or smaller than about 100 MPa.

A compressive stress profile CS of the window WM may have a shape that is symmetrical or substantially symmetrical with respect to the folding portion FP. The compressive stress profile CS may be symmetrical or substantially symmetrical with respect to an imaginary center line CTL crossing a center of the folding portion FP. However, the present disclosure is not limited thereto or thereby. According to an embodiment, the compressive stress of the first non-folding portion NFP1 and the second non-folding portion NFP2 may not be symmetrical with respect to the folding portion FP.

The second surface compressive stress of the first portions P1 and P3 shown in FIG. 6A may be zero (0). In other words, the non-folding portions NFP1 and NFP2 of the window WM may include the first portions P1 and P3, respectively, that are not chemically strengthened.

Referring to FIG. 6B, the first portions P1 and P3 of the non-folding portions NFP1 and NFP2 may include the base area BSL, and may not include the first compressive stress area CSL1 and the second compressive stress area CSL2. In addition, the second portions P2 and P4 of the non-folding portions NFP1 and NFP2 may include the base area BSL, the first compressive stress area CSL1, and the second compressive stress area CSL2, and may have the surface compressive stress that is smaller than that of the folding portion FP.

A thickness in the third directional axis DR3 of the base area BSL of the second portions P2 and P4 of the non-folding portions NFP1 and NFP2 may increase towards the first portions P1 and P3 from the folding portion FP. A thickness of the first compressive stress area CSL1 and the second compressive stress area CSL2 in the second portions P2 and P4 of the non-folding portions NFP1 and NFP2 may decrease towards the first portions P1 and P3 from the folding portion FP.

The second portions P2 and P4 of the non-folding portions NFP1 and NFP2 may be adjacent to the folding portion FP, which is chemically strengthened, and may be obtained by chemically strengthening surfaces of portions of the second portions P2 and P4 of the non-folding portions NFP1 and NFP2 through a chemical strengthening process for the folding portion FP.

FIG. 7A is a view showing a compressive stress value as a function of positions in a window WM-a according to an embodiment of the present disclosure. FIG. 7B is a cross-sectional view showing the window WM-a having a compressive stress profile CS-a shown in FIG. 7A.

Referring to FIGS. 7A and 7B, the window WM-a may include a folding portion FP, and non-folding portions NFP1-$a$ and NFP2-$a$. A recess portion HP may be defined to be recessed from one surface of the folding portion FP. The folding portion FP of the window WM-a may have a surface compressive stress that is greater than a surface compressive stress of the non-folding portions NFP1-$a$ and NFP2-$a$ of the window WM-a.

The window WM-a may include a first compressive stress area CSL1-$a$ adjacent to an upper surface WM-US, and a second compressive stress area CSL2-$a$ adjacent to a lower surface WM-BS. In addition, the window WM-a may include a base area BSL-a disposed between the first compressive stress area CSL1-$a$ and the second compressive stress area CSL2-$a$.

In the window WM-a shown in FIGS. 7A and 7B, the first non-folding portion NFP1-$a$ and the second non-folding portion NFP2-$a$ may include first portions P1-$a$ and P3-$a$ spaced apart from the folding portion FP, and second portions SP2-$a$ and SP4-$a$ disposed between the folding portion FP and the first portion P1-$a$ and between the folding portion FP and the first portion P3-$a$, respectively.

The first portions P1-$a$ and P3-$a$, the second portions P2-$a$ and P4-$a$, and the folding portion FP of the window WM-a may be portions that are chemically strengthened by providing strengthening salt pastes with different ion concentrations. In the window WM-a, a second surface compressive stress of the first portions P1-$a$ and P3-$a$ may be smaller than a first surface compressive stress of the folding portion FP. In addition, a third surface compressive stress of the second portions P2-$a$ and P4-$a$ may be smaller than the first surface compressive stress of the folding portion FP, and may be greater than the second surface compressive stress of the first portions P1-$a$ and P3-$a$.

A maximum value CS1$a$-$mx$ of the first surface compressive stress of the folding portion FP may be equal to or greater than about 500 MPa, and a maximum value CS2$a$-$mx$ of the second surface compressive stress of the first portions P1-$a$ and P3-$a$ may be equal to or greater than about 100 MPa. The second portions P2-$a$ and P4-$a$ may have the third surface compressive stress, and the third surface compressive stress may have a value between the maximum value CS1$a$-$mx$ of the first surface compressive stress of the folding portion FP and the maximum value CS2a-mx of the second surface compressive stress of the first portions P1-a and P3-a.

In the window WM-a, the first portions P1-a and P3-a may include first base portions BSL-1 and BSL-3, first upper surface compressive stress portions CP1-U and CP3-U disposed on the first base portions BSL-1 and BSL-3 and disposed adjacent to the upper surface WM-US, and first lower surface compressive stress portions CP1-B and CP3-B disposed under (e.g., underneath) the first base portions BSL-1 and BSL-3 and disposed adjacent to the lower surface WM-BS. The second portions P2-a and P4-a may include second base portions BSL-2 and BSL-4, second upper surface compressive stress portions CP2-U and CP4-U disposed on the second base portions BSL-2 and BSL-4 and disposed adjacent to the upper surface WM-US, and second lower surface compressive stress portions CP2-B and CP4-B disposed under (e.g., underneath) the second base portions BSL-2 and BSL-4 and disposed adjacent to the lower surface WM-BS. In addition, the folding portion FP may include a third base portion BSL-C, a third upper surface compressive stress portion CP-CU disposed on the third base portion BSL-C, and a third lower surface compressive stress portion CP-CB disposed under (e.g., underneath) the third base portion BSL-C.

Each of the first upper surface compressive stress portions CP1-U and CP3-U, the second upper surface compressive stress portions CP2-U and CP4-U, and the third upper surface compressive stress portion CP-CU may have a concentration of K+ ions greater than a concentration of K+ ions of each of the first base portions BSL-1 and BSL-3, the second base portions BSL-2 and BSL-4, and the third base portion BSL-C. In addition, the first upper surface compressive stress portions CP1-U and CP3-U, the second upper surface compressive stress portions CP2-U and CP4-U, and the third upper surface compressive stress portion CP-CU may have different concentrations of K+ ions from each other.

Each of the first lower surface compressive stress portions CP1-B and CP3-B, the second lower surface compressive stress portions CP2-B and CP4-B, and the third lower surface compressive stress portion CP-CB may have a concentration of K+ ions greater than the concentration of K+ ions of each of the first base portions BSL-1 and BSL-3, the second base portions BSL-2 and BSL-4, and the third base portion BSL-C. In addition, the first lower surface compressive stress portions CP1-B and CP3-B, the second lower surface compressive stress portions CP2-B and CP4-B, and the third lower surface compressive stress portion CP-CB may have different concentrations of K+ ions from each other.

In the windows WM and WM-a described above with reference to FIGS. 5 to 7B, the concentrations of K+ ions of the first portion of the non-folding portion, the second portion of the non-folding portion, and the upper and lower surfaces of the folding portion may satisfy the following Expression 1.

$$C_{NP\text{-}S1}(K+) < C_{NP\text{-}S2}(K+) < C_{FP}(K+) \quad \text{Expression 1:}$$

In Expression 1, $C_{NP\text{-}S1}(K+)$, $C_{NP\text{-}S2}(K+)$, and $C_{FP}(K+)$ denote the concentrations of K+ ions of the first portions P1 and P3 of the non-folding portion, the second portions P2 and P4 of the non-folding portion, and the upper and lower surfaces of the folding portion, respectively.

The window WM described above with reference to FIGS. 6A and 6B may satisfy the above-described Expression 1, such that $C_{NP\text{-}S1}(K+)$ in Expression 1 denotes the concentration of K+ ions of the first portions P1 and P3, and in this case, $C_{NP\text{-}S1}(K+)$ may be equal to or substantially equal to zero (0). In addition, in the window WM, $C_{NP\text{-}S2}(K+)$ denotes the concentration of K+ ions of the second portions P2 and P4, and may have a value greater than zero (0). $C_{FP}(K+)$ denotes the concentration of K+ ions of the folding portion FP, and may be greater than $C_{NP\text{-}S2}(K+)$. The concentration of K+ ions may have a maximum value in the folding portion FP. In addition, in the window WM, the surface compressive stress value of the first portions P1 and P3 may be equal to or substantially equal to zero (0), the surface compressive stress value may have a maximum value in the folding portion FP, and the surface compressive stress value in the second portions P2 and P4 may decrease towards the first portions P1 and P3 from the folding portion FP.

In other words, in the window WM described with reference to FIGS. 6A and 6B, only the folding portion FP may be selectively chemically strengthened. The first portions P1 and P3 of the non-folding portions NFP1 and NFP2 may be portions that are not chemically strengthened, and the second portions P2 and P4 of the non-folding portions NFP1 and NFP2 may be portions where the chemical strengthening by the ion exchange occurs in some areas due to an influence of the folding portion FP adjacent thereto.

In addition, the window WM-a described above with reference to FIGS. 7A and 7B may also satisfy the above-described Expression 1. In the case of the window WM-a, the $C_{NP\text{-}S1}(K+)$ may be the concentration of K+ ions of the first portions P1-a and P3-a and may be greater than zero (0). In addition, in the window WM-a, the $C_{NP\text{-}S2}(K+)$ may be the concentration of K+ ions of the second portions P2-a and P4-a and may be greater than $C_{NP\text{-}S1}(K+)$. In addition, the $C_{FP}(K+)$ may be the concentration of K+ ions of the folding portion FP and may be greater than $C_{NP\text{-}S2}(K+)$, and the concentration of K+ ions may have the maximum value in the folding portion FP.

In the case of the window WM-a described above with reference to FIGS. 7A and 7B, the entire portion of the folding portion FP and the non-folding portions NFP1-a and NFP2-a may be chemically strengthened using the strengthening salt paste. In the window WM-a, the first portions P1-a and P3-a, the second portions P2-a and P4-a, and the folding portion FP may be chemically strengthened at different levels from each other. As an example, the first portions P1-a and P3-a, the second portions P2-a and P4-a, and the folding portion FP of the window WM-a may have different concentrations of K+ ions, and the concentration of K+ ions may increase in the order of the first portions P1-a and P3-a, the second portions P2-a and P4-a, and the folding portion FP.

The portions having different concentrations of K+ ions may be portions that are chemically strengthened by using strengthening salt pastes containing different $KNO_3$ contents, respectively, in the manufacturing method of the window, which will be described in more detail below. As an example, the portions with different concentrations of K+ ions may be distinguished from each other due to a weight ratio of K+ ions that differs by about 5% or more. According to an embodiment, a difference between a weight ratio of K+ ions of areas of the second portions P2-a and P4-a adjacent to the folding portion FP and a weight ratio of K+ ions of areas of the second portions P2-a and P4-a adjacent to the first portions P1-a and P3-a may be equal to or greater than about 5%.

While the window WM-a described above with reference to FIGS. 7A and 7B is shown as being divided into three portions with different concentrations of K+ ions, the present disclosure is not limited thereto or thereby. As an example, according to an embodiment, a window may be divided into four or more portions with different concentrations of K+ ions. In other words, in a case where the window is chemically strengthened by using four strengthening salt pastes containing different $KNO_3$ contents in the manufacturing method of the window, the window that is divided into four or more portions with different concentrations of K+ ions may be provided.

In addition, in the window WM-a described above with reference to FIGS. 7A and 7B, the concentrations of Na+ ions of the first portion of the non-folding portion, the second portion of the non-folding portion, and the upper and lower surfaces of the folding portion may satisfy the following Expression 2.

$$C_{NP-S1}(Na+) > C_{NP-S2}(Na+) > C_{FP}(Na+) \quad \text{Expression 2:}$$

In Expression 2, $C_{NP-S1}(Na+)$, $C_{NP-S2}(Na+)$, and $C_{FP}(Na+)$ denote the concentrations of Na+ ions of the first portions P1-a and P3-a of the non-folding portion, the second portions P2-a and P4-a of the non-folding portion, and the upper and lower surfaces of the folding portion, respectively.

The window WM-a satisfying Expression 2 may correspond to a window where the strengthening salt paste used in the chemical strengthening process contains KNOB and $NaNO_3$. In the window WM-a satisfying Expression 2, $C_{NP-S1}(Na+)$ denotes the concentration of Na+ ions in the first portions P1-a and P3-a, $C_{NP-S2}(Na+)$ denotes the concentration of Na+ ions in the second portions P2-a and P4-a, and $C_{FP}(Na+)$ denotes the concentration of Na+ ions in the folding portion FP. $C_{FP}(Na+)$ denoting the concentration of Na+ ions in the folding portion FP may be equal to or greater than zero (0).

In the window WM-a satisfying Expression 2, the first portions P1-a and P3-a, the second portions P2-a and P4-a, and the folding portion FP may be chemically strengthened by using the strengthening salt pastes having different compositions from each other, respectively. A weight ratio of $NaNO_3$ in the strengthening salt paste provided in the folding portion FP may be the lowest, and the weight ratio of $NaNO_3$ in the provided strengthening salt paste may increase from the second portions P2-a and P4-a to the first portions P1-a and P3-a.

While the window WM-a satisfying Expression 2 is described above as being divided into three portions with different concentrations of Na+ ions, the present disclosure is not limited thereto or thereby. As an example, according to an embodiment, a window may be divided into four or more portions with different concentrations of Na+ ions. In other words, in a case where the window is chemically strengthened by using four strengthening salt pastes containing different $NaNO_3$ contents in the manufacturing method of the window, the window that is divided into four or more portions with different concentrations of Na+ ions may be provided.

In addition, unlike the embodiments described above, a window may be divided into two portions with different concentrations of Na+ ions. In other words, in a case where the window is chemically strengthened by using two strengthening salt pastes containing different $NaNO_3$ contents in the manufacturing method of the window, the window that is divided into two portions with different concentrations of Na+ ions may be provided. As an example, the concentration of Na+ ions in the folding portion FP may be different from the concentration of Na+ ions in the non-folding portions NFP1-a and NFP2-a.

The windows WM and WM-a described above with reference to FIGS. 5 to 7B may include the folding portion and the non-folding portions, and the non-folding portions may have the surface compressive stress that is lower than that of the folding portion. In addition, the non-folding portions of the windows WM and WM-a may be portions that are not chemically strengthened, or portions that are chemically strengthened at a lower degree when compared to the folding portion. Accordingly, the folding portion of the windows WM and WM-a may have a higher surface compressive stress due to the chemical strengthening, and thus, the windows WM and WM-a may have high reliability during the folding operation. In addition, the degree of the chemical strengthening process performed on the non-folding portions may be lowered, and the strength of the glass substrate may be maintained or substantially maintained. As a result, the impact resistance of the window (e.g., the entire window) may be maintained or substantially maintained.

Table 1 below shows results of an evaluation of the impact resistance before and after the chemical strengthening process. In Table 1, "maximum load" is obtained by measuring a force at a moment when a test sample is broken after a pen is placed on the test sample and the load applied to the pen is gradually increased. As the test sample, the glass substrate is used. In Table 1, "before the chemical strengthening" indicates the glass substrate before the chemical strengthening process, and "after the chemical strengthening" indicates the glass substrate after the chemical strengthening process.

TABLE 1

|  | Before chemical strengthening | After chemical strengthening |
| --- | --- | --- |
| maximum load N | 9.94 | 3.34 |

Referring to the results of Table 1, it is observed that the maximum load before the chemical strengthening process is larger than the maximum load after the chemical strengthening process. In other words, it is observed that the impact resistance of the glass substrate is significantly lowered by the chemical strengthening process.

Accordingly, the window may be formed such that only the folding portion includes the compressive stress area that is selectively and chemically strengthened and the non-folding portions include only the base area that is not chemically strengthened, or the window may be formed such that the chemical strengthening degree of the non-folding portions is lowered compared with that of the folding portion and the surface compressive stress of the non-folding portions is decreased to increase the strength of the non-folding portion. Accordingly, the window may have excellent folding reliability and impact resistance.

As the window WM for the electronic devices ED, ED-1, ED-a, and ED-a1 described above with reference to FIGS. 1A to 4, the windows WM and WM-a described with reference to FIGS. 5 to 7B may be used. Accordingly, the electronic device including the window may have the excellent folding reliability and impact resistance.

Hereinafter, a manufacturing method of the window will be described in more detail with reference to FIGS. 8 to 10B. In the manufacturing method of the window, redundant description of the window as those described with reference to the above embodiments may not be repeated, and different features may be mainly described.

FIG. 8 is a flowchart showing the manufacturing method of the window according to an embodiment of the present disclosure. FIGS. 9A to 10B are views schematically showing various processes of the manufacturing method of the window according to an embodiment of the present disclosure.

The manufacturing method of the window may include providing a base glass BG (S100), providing the strengthening salt paste PST (S300), heat-treating the strengthening salt paste PST (S500), and cleaning the strengthening salt paste PST (S700).

In the manufacturing method of the window, the base glass BG provided in the providing of the base glass (S100) may be manufactured by a float process. In addition, the base glass BG may be manufactured by a down draw process or a fusion process, but the present disclosure is not limited thereto or thereby. The base glass BG may be manufactured by various suitable methods as would be understood by those having ordinary skill in the art.

The base glass BG provided in the providing of the base glass (S100) may be provided after being cut in consideration of an intended use. In other words, the base glass BG may be cut and provided by reflecting a desired size of the product in accordance with the purpose of use of the window applied to the electronic devices, but the present disclosure is not limited thereto or thereby. The base glass BG may be provided in a suitable size that does not match a size of a final product, and may be cut and processed to the size of the final product after the manufacturing process of the window.

The base glass BG provided in the providing of the base glass (S100) may include $SiO_2$, $Al_2O_3$, and $Li_2O_3$. As an example, the base glass BG may include about 50 wt % or more and/or about 80 wt % or less of $SiO_2$, about 10 wt % or more and/or about 30 wt % or less of $Al_2O_3$, and about 3 wt % or more and/or about 20 wt % or less of $Li_2O_3$.

According to an embodiment, the base glass BG may include $SiO_2$, $Al_2O_3$, $Li_2O_3$, and $Na_2O$. In some embodiments, the base glass BG may further include at least one of $P_2O_5$, $K_2O$, $MgO$, and $CaO$, in addition to $SiO_2$, $Al_2O_3$, $Li_2O_3$, and $Na_2O$.

The base glass BG may include the folding portion FP that is able to be changed into the folded form by the folding operation when applied to the electronic device, and the non-folding portions NFP1, NFP2, NFP1-a, and NFP2-a adjacent to the folding portion FP. The first non-folding portions NFP1 and NFP1-a and the second non-folding portions NFP2 and NFP2-a may be disposed to be spaced apart from each other with the folding portion FP interposed therebetween. The folding portion FP may be provided with the recess portion HP defined therein. The recess portion HP may be defined in the folding portion FP, and may be recessed toward an upper surface US from a lower surface BS of the base glass BG.

The providing of the strengthening salt paste (S300) may be a process of providing the strengthening salt paste PST to the base glass BG. The strengthening salt paste PST may be provided to the upper surface US and the lower surface BS of the base glass BG. In the providing of the strengthening salt paste (S300), the strengthening salt paste PST may be provided only to the folding portion FP, or a plurality of strengthening salt pastes PST-a, PST-b, and PST-c having different concentrations of K+ ions from one another may be provided to the folding portion FP and the non-folding portions NFP1, NFP2, NFP1-a, and NFP2-a. The strengthening salt pastes PST, PST-a, PST-b, and PST-c may have a viscosity to the extent that the strengthening salt pastes PST, PST-a, PST-b, and PST-c do not flow, and may be provided only to selected areas when being provided on the base glass BG. The strengthening salt paste PST may be selectively applied to an area of the base glass BG, or different strengthening salt pastes PST-a, PST-b, and PST-c may be provided to different areas of the base glass BG.

The base glass BG may be heated at a suitable temperature (e.g., a predetermined temperature) or more in the providing of the strengthening salt paste (S300), and the strengthening salt paste PST may be provided on the heated base glass BG. As an example, the base glass BG may be heated until a surface temperature thereof reaches about 100° C. As the strengthening salt paste PST is provided on the heated base glass BG, the provided strengthening salt paste PST may be dried more quickly due to the heat of the surface of the base glass BG. Thus, a liquidity of the strengthening salt paste PST may decrease, and the flow of the strengthening salt paste PST may be controlled. Accordingly, the strengthening salt paste PST may be selectively provided only to the area on the base glass BG, or different strengthening salt pastes PST-a, PST-b, and PST-c may be provided to different areas of the base glass BG without being mixed with each other.

The strengthening salt pastes PST, PST-a, PST-b, and PST-c may include distilled water, viscosity control particles, and a strengthening salt. For example, the strengthening salt may include $KNO_3$. In addition, the strengthening salt pastes PST, PST-a, PST-b, and PST-c may include at least one of $Al_2O_3$, $SiO_2$, or $ZnO$ as the viscosity control particles. The viscosity control particles may further include inorganic scattering particles, in addition to the $Al_2O_3$, $SiO_2$, or $ZnO$. According to an embodiment, the strengthening salt pastes PST, PST-a, PST-b, and PST-c may further include at least one of $K_2CO_3$ or $Na_2CO_3$ as an additive.

According to an embodiment, the strengthening salt pastes PST, PST-a, PST-b, and PST-c may further include $NaNO_3$ as the strengthening salt. As an example, the strengthening salt pastes PST, PST-a, PST-b, and PST-c may include only $K_2CO_3$, or may include $KNO_3$ and $NaNO_3$.

Figure 9A:
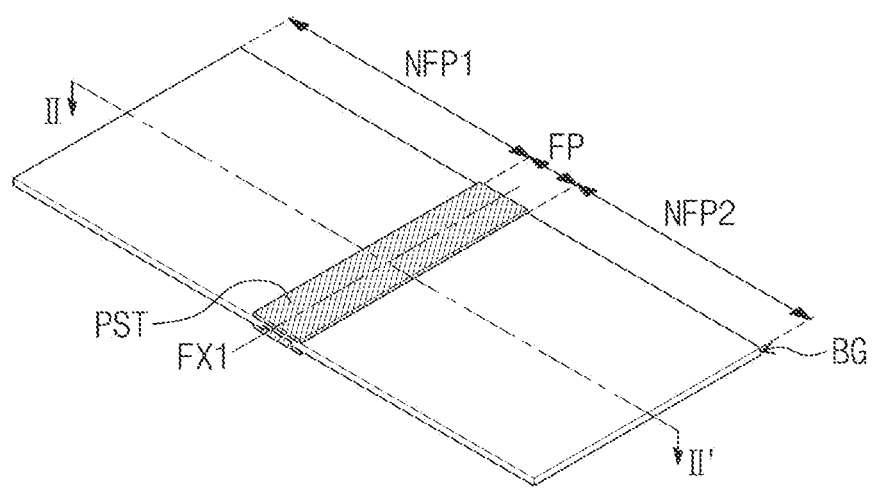
FIG. 9A is a perspective view schematically showing a process of a method of manufacturing a window according to an embodiment of the present disclosure.

FIGS. 9A and 9B show a state in which the strengthening salt paste PST is provided only to the folding portion FP of the base glass BG in the providing of the strengthening salt paste (S300). According to an embodiment, the strengthening salt paste PST may be selectively provided to the folding portion FP, and may not be provided to the non-folding portions NFP1 and NFP2. The strengthening salt paste PST may be provided to the upper and lower surfaces of the folding portion FP including the recess portion HP. The strengthening salt paste PST may include only $KNO_3$ as the strengthening salt, or may include $KNO_3$ and $NaNO_3$ as the strengthening salt. As an example, the strengthening salt paste PST provided only to the folding portion FP may include about 50 g of $KNO_3$, about 10 g of $K_2CO_3$, and about 30 g of ZnO powder with about 100 ml of distilled water as a solvent, but the present disclosure is not limited thereto or thereby.

The window manufactured by the manufacturing method including the providing of the strengthening salt paste (S300) shown in FIGS. 9A and 9B may have the configuration of the window described above with reference to FIGS. 6A and 6B.

Figure 10A:
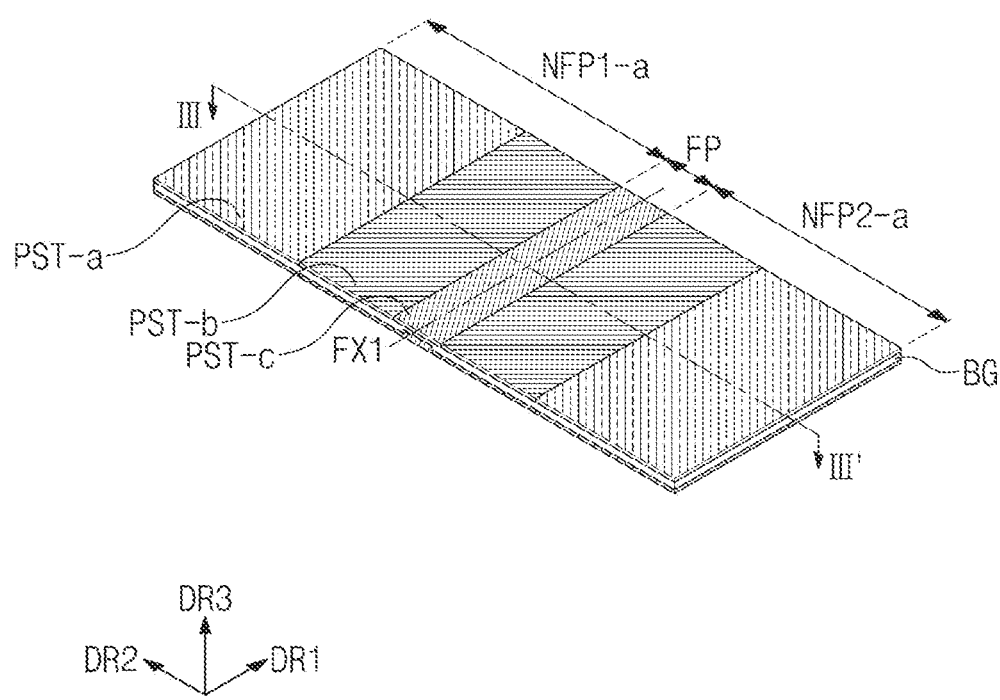
FIG. 10A is a perspective view schematically showing a process of a method of manufacturing a window according to an embodiment of the present disclosure.
Figure 10B:
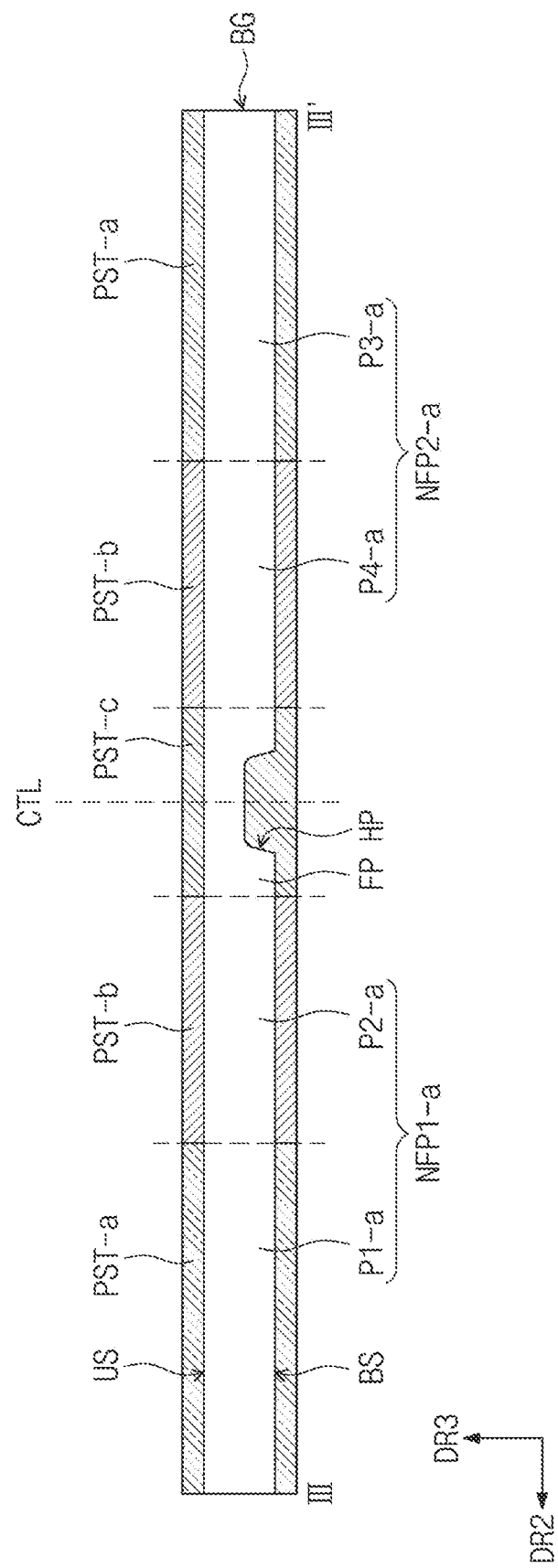
FIG. 10B is a cross-sectional view showing a process of a method of manufacturing a window according to an embodiment of the present disclosure.

FIGS. 10A and 10B show a state in which different strengthening salt pastes are provided to the first portions P1-a and P3-a, the second portions P2-a and P4-a, and the folding portion FP of the base glass BG, respectively, in the providing of the strengthening salt paste (S300). A first strengthening salt paste PST-a may be provided to the first portions P1-a and P3-a of the non-folding portions NFP1-a and NFP2-a, which are spaced apart from each other in the folding portion FP. In addition, a second strengthening salt paste PST-b may be provided to the second portions P2-a and P4-a of the non-folding portions NFP1-a and NFP2-a, which are disposed between the first portion SP1-a and the folding portion FP and between the first portion SP3-a and the folding portion FP, respectively. A third strengthening salt paste PST-c may be provided to the folding portion FP.

The first strengthening salt paste PST-a, the second strengthening salt paste PST-b, and the third strengthening salt paste PST-c may have a difference in a weight ratio of the strengthening salt. The first strengthening salt paste PST-a, the second strengthening salt paste PST-b, and the third strengthening salt paste PST-c may have a difference in the weight ratio of $KNO_3$ and $NaNO_3$ of the strengthening salt.

In the first strengthening salt paste PST-a, the second strengthening salt paste PST-b, and the third strengthening salt paste PST-c, the weight ratio of $KNO_3$ to $NaNO_3$ may satisfy the following Expression 3.

$$KNO_3:NaNO_3=(100-X)\%:X\%$$    Expression 3:

In Expression 3, X denotes the weight ratio of $NaNO_3$ to the strengthening salt included in the strengthening salt paste. In Expression 3, X may be greater than or equal to zero (0) and less than or equal to about 50. According to an embodiment, when the weight ratios of $NaNO_3$ to the strengthening salt in the first strengthening salt paste PST-a, the second strengthening salt paste PST-b, and the third strengthening salt paste PST-c are referred to as X1, X2, and X3, respectively, X1, X2, and X3 may satisfy the Expression X1>X2>X3.

In other words, the weight ratio of $NaNO_3$ to the strengthening salt of the third strengthening salt paste PST-c provided to the folding portion FP of the base glass BG in the manufacturing method of the window may be smaller than the weight ratio of $NaNO_3$ to the strengthening salt of the first strengthening salt paste PST-a and the second strengthening salt paste PST-b, which are provided to the first portions P1-a and P3-a and the second portions P2-a and P4-a, respectively.

According to an embodiment, a difference between X1 and X2 may be equal to or greater than about 5%, and a difference between X2 and X3 may be equal to or greater than about 5%. In addition, according to an embodiment, X3 may be equal to or substantially equal to zero (0), and the difference between X1 and X2 may be equal to or greater than about 5%. The weight ratios of $NaNO_3$ to the strengthening salt of the strengthening salt pastes provided to portions adjacent to each other in the base glass BG may have a difference of about 5%.

As an example, the weight ratio of $KNO_3$ to $NaNO_3$ in the first strengthening salt paste PST-a may be 50%:50%, the weight ratio of $KNO_3$ to $NaNO_3$ in the second strengthening salt paste PST-b may be 80%:20%, and the weight ratio of $KNO_3$ to $NaNO_3$ in the third strengthening salt paste PST-c may be 100%:0%. However, the present disclosure is not limited thereto or thereby.

As described above with reference to Expression 3 and FIGS. 10A and 10B, the strengthening salt pastes may include three strengthening salt pastes having different weight ratios of the strengthening salt from each other, but the present disclosure is not limited thereto or thereby. According to an embodiment, in the providing of the strengthening salt paste (S300), four or more kinds of strengthening salt pastes having different weight ratios of the strengthening salt may be provided within a range where X satisfies a range from zero (0) to 50 in the Expression 3. In addition, the strengthening salt pastes may be separately provided to the folding portion FP and the non-folding portions NFP1-a and NFP2-a.

The window manufactured by the manufacturing method including the providing of the strengthening salt paste (S300) shown in FIGS. 10A and 10B may have the configuration of the window described above with reference to FIGS. 7A and 7B.

In the manufacturing method of the window, the heat-treating of the strengthening salt paste (S500) may be performed after the providing of the strengthening salt paste (S300). As described above with reference to FIGS. 9A, 9B, 10A, and 10B, the heat-treating of the strengthening salt paste (S500) may include heat-treating the strengthening salt pastes PST, PST-a, PST-b, and PST-c provided on the base glass BG at a temperature greater than or equal to about 365° C. and less than or equal to about 400° C. after the strengthening salt pastes PST, PST-a, PST-b, and PST-c are provided on the base glass BG as described above with reference to FIGS. 9A, 9B, 10A, and 10B. The heat-treating of the strengthening salt paste (S500) may be performed within about 1 hour at the temperature of about 365° C. or higher and about 400° C. or lower. As an example, the heat-treating of the strengthening salt paste (S500) may be performed within about 1 hour at the temperature of about 380° C. or higher and about 400° C. or lower.

The providing of the strengthening salt paste (S300) and the heat-treating of the strengthening salt paste (S500) may be sequentially performed to chemically strengthen the base glass BG. The surface of the base glass BG may be strengthened through the ion exchange method by the strengthening salt included in the strengthening salt paste provided to the base glass BG in the providing of the strengthening salt paste (S300) and the heat-treating of the strengthening salt paste (S500).

The chemical strengthening process for the base glass BG may be achieved by exchanging alkali metal ions with a relatively small ion radius contained in the surface of the base glass BG on which the strengthening salt paste is provided with alkali metal ions with a relatively large ion radius contained in the strengthening salt paste. As an example, the surface strengthening may be achieved by exchanging $Li^+$ or $Na^+$ ions in the surface of the base glass BG with $Na^+$ or $K^+$ ions provided in the strengthening salt paste, respectively. The windows WM and WM-a (e.g., refer to FIGS. 6A and 7B) manufactured with the base glass BG that is surface strengthened by the ion exchange may include the compressive stress areas CSL1, CSL2, CSL-1a, and CSL-2a (e.g., refer to FIGS. 6B and 7B).

The cleaning of the strengthening salt paste (S700) may be performed after the heat-treating of the strengthening salt paste (S500). The strengthening salt paste may be removed in the cleaning process after the strengthening process is completed. The cleaning of the strengthening salt paste (S700) may be carried out using the distilled water, or using an acid solution or an alkali solution. Residues of the strengthening salt paste or foreign substances may be removed in the cleaning of the strengthening salt paste (S700), and defective portions on the surface of the manufactured window may be removed.

As the window may include the non-folding portions having the surface compressive stress lower than the surface compressive stress of the folding portion, the reliability of the folding portion during the folding operation may be maintained or substantially maintained, and the window may have improved impact resistance. In other words, because the window may include the non-folding portion that is not chemically strengthened, or may include the non-folding portions that is chemically strengthened with a relatively lower degree, the impact resistance characteristics of the glass may be maintained or substantially maintained, and the window may have excellent impact resistance compared with a window where the entire glass substrate is chemically strengthened.

The electronic device may include the window disposed above the display module, the folding portion provided with the recess portion defined in the surface adjacent to the display module, and the first and second non-folding portions disposed with the folding portion interposed therebetween, and the first non-folding portion and the second non-folding portion may not be chemically strengthened or may be chemically strengthened at a lower degree than that of the folding portion. Accordingly, the electronic device may have excellent folding characteristics and impact resistance.

The manufacturing method of the window may include the providing of the strengthening salt paste to only the folding portion of the base glass, or the providing of the strengthening salt pastes having different concentrations of K+ ions to the folding portion and the non-folding portions. Accordingly, the non-folding portions may not be chemically strengthened, or the degree of the chemical strengthening of the non-folding portions may be lower compared with that of the folding portion. According to the manufacturing method of the window, the surface compressive stress may increase in the folding portion, and thus, the folding reliability may be improved. In addition, the strength of the glass may be maintained or substantially maintained in the non-folding portions, and thus, impact resistance of the window may be improved.

Although some embodiments have been described, those skilled in the art will readily appreciate that various modifications are possible in the embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific embodiments disclosed herein, and that various modifications to the disclosed embodiments, as well as other example embodiments, are intended to be included within the spirit and scope of the present disclosure as defined in the appended claims, and their equivalents.

What is claimed is:

1. A method of manufacturing a window, comprising:
    providing a base glass comprising a folding portion, and a non-folding portion adjacent to the folding portion;
    providing a strengthening salt paste to the base glass;
    heat-treating the strengthening salt paste; and
    cleaning the strengthening salt paste after the heat-treating,
    wherein the non-folding portion of the base glass comprises:
        a first portion spaced from the folding portion of the base glass; and
        a second portion between the first portion and the folding portion of the base glass, and
    wherein a concentration of K+ ions of the strengthening salt paste increases in an order of the first portion, the second portion, and the folding portion of the base glass.

2. The method of claim 1, wherein the folding portion has a recess portion defined therein.

3. The method of claim 2,
    wherein the base glass comprises an upper surface and a lower surface opposite to the upper surface,
    wherein the recess portion is recessed from the lower surface of the base glass toward the upper surface of the base glass, and
    wherein the upper surface of the folding portion is a flat surface.

4. The method of claim 3, wherein the strengthening salt paste is provided to each of the upper surface and the lower surface of the base glass.

5. The method of claim 1, wherein the strengthening salt paste comprises distilled water, viscosity control particles, and a strengthening salt comprising $KNO_3$.

6. The method of claim 5, wherein the strengthening salt paste comprises first, second, and third strengthening salt pastes provided to the first portion, the second portion, and the folding portion, respectively, and a weight ratio of $KNO_3$ to $NaNO_3$ in each of the first, second, and third strengthening salt pastes is $KNO_3:NaNO_3=(100-X)$ %:X %,
    where:
        X denotes the weight ratio of $NaNO_3$ to a corresponding strengthening salt included in a corresponding one of the first, second, or third strengthening salt pastes;
        when X of the first strengthening salt paste, X of the second strengthening salt paste, and X of the third strengthening salt paste correspond to X1, X2, and X3, respectively, X1, X2, and X3 satisfy X1>X2>X3; and
        X of each of the first, second, and third strengthening salt pastes is greater than or equal to zero (0) and less than or equal to about 50.

7. The method of claim 6, wherein a difference between X1 and X2 is equal to or greater than about 5%, and a difference between X2 and X3 is equal to or greater than about 5%.

8. The method of claim 6, wherein X3 is zero (0), and a difference between X1 and X2 is equal to or greater than about 5%.

9. The method of claim 5, wherein the viscosity control particles comprise at least one of $Al_2O_3$, $SiO_2$, or ZnO.

10. The method of claim 5, wherein the providing of the strengthening salt paste comprises providing first, second, and third strengthening salt pastes to the first portion, the second portion, and the folding portion, respectively, and
    wherein the first and second strengthening salt pastes further comprise $NaNO_3$ as the strengthening salt.

11. The method of claim 1, wherein the heat-treating of the strengthening salt paste is carried out at a temperature greater than or equal to about 365° C. and less than or equal to about 400° C.

* * * * *